(12) United States Patent
Gorobets et al.

(10) Patent No.: US 8,543,757 B2
(45) Date of Patent: Sep. 24, 2013

(54) TECHNIQUES OF MAINTAINING LOGICAL TO PHYSICAL MAPPING INFORMATION IN NON-VOLATILE MEMORY SYSTEMS

(75) Inventors: Sergey Anatolievich Gorobets, Edinburgh (GB); Robert George Young, Pilrig (GB)

(73) Assignee: SanDisk Technologies Inc., Plano, TX (US)

( * ) Notice: Subject to any disclaimer, the term of this patent is extended or adjusted under 35 U.S.C. 154(b) by 500 days.

(21) Appl. No.: 12/821,423

(22) Filed: Jun. 23, 2010

(65) Prior Publication Data

US 2011/0320684 A1     Dec. 29, 2011

(51) Int. Cl.
*G06F 12/02*     (2006.01)

(52) U.S. Cl.
USPC ............................. 711/103; 711/165

(58) Field of Classification Search
USPC .................................. 711/103, 165
See application file for complete search history.

(56) References Cited

U.S. PATENT DOCUMENTS

| | | |
|---|---|---|
| 5,070,032 A | 12/1991 | Yuan et al. |
| 5,095,344 A | 3/1992 | Harari |
| 5,313,421 A | 5/1994 | Guterman et al. |
| 5,315,541 A | 5/1994 | Harari et al. |
| 5,343,063 A | 8/1994 | Yuan et al. |
| 5,570,315 A | 10/1996 | Tanaka et al. |
| 5,661,053 A | 8/1997 | Yuan |
| 5,768,192 A | 6/1998 | Eitan |
| 5,903,495 A | 5/1999 | Takeuchi et al. |
| 5,930,167 A | 7/1999 | Lee et al. |
| 5,936,971 A | 8/1999 | Harari et al. |
| 6,011,725 A | 1/2000 | Eitan |
| 6,046,935 A | 4/2000 | Takeuchi et al. |
| 6,222,762 B1 | 4/2001 | Guterman et al. |
| 6,456,528 B1 | 9/2002 | Chen |
| 6,567,307 B1 | 5/2003 | Estakhri |
| 6,567,815 B1 | 5/2003 | Rubin et al. |
| 6,657,891 B1 | 12/2003 | Shibata et al. |
| 6,870,768 B2 | 3/2005 | Cernea et al. |
| 7,057,939 B2 | 6/2006 | Li et al. |
| 7,315,917 B2 | 1/2008 | Bennett et al. |
| 7,444,461 B2 | 10/2008 | Traister et al. |
| 7,464,216 B2 | 12/2008 | Gorobets |

(Continued)

FOREIGN PATENT DOCUMENTS

| | | |
|---|---|---|
| WO | WO 00/49488 | 8/2000 |
| WO | WO 03/027828 | 4/2003 |

OTHER PUBLICATIONS

Eitan et al., "NROM: A Novel Localized Trapping, 2-Bit Nonvolatile Memory Cell," *IEEE Electron Device Letters*, vol. 21, No. 11, Nov. 2000, pp. 543-545.

(Continued)

*Primary Examiner* — Jared Rutz
(74) *Attorney, Agent, or Firm* — Davis Wright Tremaine LLP

(57) ABSTRACT

A non-volatile memory system writes logical to physical conversion data to the same memory blocks as user data, and as part of the same page as a segment of user data, as data segments are received and written. When a data block is subsequently compacted and obsolete data removed, the user data from the block is written to a one block and some or all of the logical to physical conversion data from the block is written to another block dedicated for the storage of such logical to physical mapping data.

8 Claims, 28 Drawing Sheets

(56) References Cited

U.S. PATENT DOCUMENTS

| | | | |
|---|---|---|---|
| 7,516,298 | B2 | 4/2009 | Johnson et al. |
| 2004/0128329 | A1 | 7/2004 | Ben-Yitzhak et al. |
| 2005/0144365 | A1 | 6/2005 | Gorobets et al. |
| 2007/0061502 | A1 | 3/2007 | Lasser |
| 2007/0283081 | A1 | 12/2007 | Lasser |
| 2008/0126680 | A1* | 5/2008 | Lee et al. ............... 711/103 |
| 2008/0162612 | A1 | 7/2008 | Tomlin et al. |
| 2009/0089481 | A1 | 4/2009 | Kapoor et al. |
| 2009/0216938 | A1* | 8/2009 | Conley et al. ............ 711/103 |
| 2010/0023672 | A1 | 1/2010 | Gorobets et al. |
| 2010/0082886 | A1* | 4/2010 | Kwon et al. ............. 711/103 |

OTHER PUBLICATIONS

U.S. Appl. No. 12/348,819 entitled "Wear Leveling for Non-Volatile Memories: Maintenance of Experience Count and Passive Techniques," filed Jan. 5, 2009, 73 pages.

U.S. Appl. No. 12/348,825 entitled "Spare Block Management in Non-Volatile Memories," filed Jan. 5, 2009, 76 pages.

U.S. Appl. No. 12/348,895 entitled "Nonvolatile Memory With Write Cache Having Flush/Eviction Methods," filed Jan. 5, 2009, 151 pages.

U.S. Appl. No. 12/348,899 entitled "Non-Volatile Memory and Method With Write Cache Partition Management Methods," filed Jan. 5, 2009, 149 pages.

U.S. Appl. No. 12/348,891 entitled "Non-Volatile Memory and Method With Write Cache Partitioning," filed Jan. 5, 2009, 151 pages.

U.S. Appl. No. 61/142,620 entitled "Non-Volatile Memory and Method With Improved Block Management System," filed Jan. 5, 2009, 144 pages.

U.S. Appl. No. 12/642,584 entitled "Maintaining Updates of Multi-Level Non-Volatile Memory in Binary Non-Volatile Memory," filed Dec. 18, 2009, 76 pages.

U.S. Appl. No. 12/642,611 entitled "Non-Volatile Memory with Multi-Gear Control Using On-Chip Folding of Data," filed Dec. 18, 2009, 74 pages.

U.S. Appl. No. 12/642,649 entitled "Data Transfer Flows for On-Chip Folding," filed Dec. 18, 2009, 73 pages.

U.S. Appl. No. 12/642,728 entitled "Non-Volatile Memory and Method With Post-Write Read and Adaptive Re-Write to Manage Errors," filed Dec. 18, 2009, 70 pages.

U.S. Appl. No. 12/642,740 entitled "Non-Volatile Memory and Method With Atomic Program Sequence and Write Abort Detection," Filed Dec. 18, 2009, 60 pages.

\* cited by examiner

Programming into Four States Represented by a 2-bit Code

Lower Page Read (2-bit Code)

Upper Page Read (2-bit Code)

TECHNIQUES OF MAINTAINING LOGICAL TO PHYSICAL MAPPING INFORMATION IN NON-VOLATILE MEMORY SYSTEMS

FIELD OF INVENTION

This application relates to the operation of re-programmable non-volatile memory systems such as semiconductor flash memory, and, more specifically, to the management of logical to physical mapping data in such systems.

BACKGROUND

Solid-state memory capable of nonvolatile storage of charge, particularly in the form of EEPROM and flash EEPROM packaged as a small form factor card, has recently become the storage of choice in a variety of mobile and handheld devices, notably information appliances and consumer electronics products. Unlike RAM (random access memory) that is also solid-state memory, flash memory is non-volatile, and retaining its stored data even after power is turned off. Also, unlike ROM (read only memory), flash memory is rewritable similar to a disk storage device. In spite of the higher cost, flash memory is increasingly being used in mass storage applications. Conventional mass storage, based on rotating magnetic medium such as hard drives and floppy disks, is unsuitable for the mobile and handheld environment. This is because disk drives tend to be bulky, are prone to mechanical failure and have high latency and high power requirements. These undesirable attributes make disk-based storage impractical in most mobile and portable applications. On the other hand, flash memory, both embedded and in the form of a removable card is ideally suited in the mobile and handheld environment because of its small size, low power consumption, high speed and high reliability features.

Flash EEPROM is similar to EEPROM (electrically erasable and programmable read-only memory) in that it is a non-volatile memory that can be erased and have new data written or "programmed" into their memory cells. Both utilize a floating (unconnected) conductive gate, in a field effect transistor structure, positioned over a channel region in a semiconductor substrate, between source and drain regions. A control gate is then provided over the floating gate. The threshold voltage characteristic of the transistor is controlled by the amount of charge that is retained on the floating gate. That is, for a given level of charge on the floating gate, there is a corresponding voltage (threshold) that must be applied to the control gate before the transistor is turned "on" to permit conduction between its source and drain regions. In particular, flash memory such as Flash EEPROM allows entire blocks of memory cells to be erased at the same time.

The floating gate can hold a range of charges and therefore can be programmed to any threshold voltage level within a threshold voltage window. The size of the threshold voltage window is delimited by the minimum and maximum threshold levels of the device, which in turn correspond to the range of the charges that can be programmed onto the floating gate. The threshold window generally depends on the memory device's characteristics, operating conditions and history. Each distinct, resolvable threshold voltage level range within the window may, in principle, be used to designate a definite memory state of the cell.

The transistor serving as a memory cell is typically programmed to a "programmed" state by one of two mechanisms. In "hot electron injection," a high voltage applied to the drain accelerates electrons across the substrate channel region. At the same time a high voltage applied to the control gate pulls the hot electrons through a thin gate dielectric onto the floating gate. In "tunneling injection," a high voltage is applied to the control gate relative to the substrate. In this way, electrons are pulled from the substrate to the intervening floating gate. While the term "program" has been used historically to describe writing to a memory by injecting electrons to an initially erased charge storage unit of the memory cell so as to alter the memory state, it has now been used interchangeable with more common terms such as "write" or "record."

The memory device may be erased by a number of mechanisms. For EEPROM, a memory cell is electrically erasable, by applying a high voltage to the substrate relative to the control gate so as to induce electrons in the floating gate to tunnel through a thin oxide to the substrate channel region (i.e., Fowler-Nordheim tunneling.) Typically, the EEPROM is erasable byte by byte. For flash EEPROM, the memory is electrically erasable either all at once or one or more minimum erasable blocks at a time, where a minimum erasable block may consist of one or more sectors and each sector may store 512 bytes or more of data.

The memory device typically comprises one or more memory chips that may be mounted on a card. Each memory chip comprises an array of memory cells supported by peripheral circuits such as decoders and erase, write and read circuits. The more sophisticated memory devices also come with a controller that performs intelligent and higher level memory operations and interfacing.

There are many commercially successful non-volatile solid-state memory devices being used today. These memory devices may be flash EEPROM or may employ other types of nonvolatile memory cells. Examples of flash memory and systems and methods of manufacturing them are given in U.S. Pat. Nos. 5,070,032, 5,095,344, 5,315,541, 5,343,063, and 5,661,053, 5,313,421 and 6,222,762. In particular, flash memory devices with NAND string structures are described in U.S. Pat. Nos. 5,570,315, 5,903,495, 6,046,935. Also nonvolatile memory devices are also manufactured from memory cells with a dielectric layer for storing charge. Instead of the conductive floating gate elements described earlier, a dielectric layer is used. Such memory devices utilizing dielectric storage element have been described by Eitan et al., "NROM: A Novel Localized Trapping, 2-Bit Nonvolatile Memory Cell," IEEE Electron Device Letters, vol. 21, no. 11, November 2000, pp. 543-545. An ONO dielectric layer extends across the channel between source and drain diffusions. The charge for one data bit is localized in the dielectric layer adjacent to the drain, and the charge for the other data bit is localized in the dielectric layer adjacent to the source. For example, U.S. Pat. Nos. 5,768,192 and 6,011,725 disclose a nonvolatile memory cell having a trapping dielectric sandwiched between two silicon dioxide layers. Multi-state data storage is implemented by separately reading the binary states of the spatially separated charge storage regions within the dielectric.

In order to improve read and program performance, multiple charge storage elements or memory transistors in an array are read or programmed in parallel. Thus, a "page" of memory elements are read or programmed together. In existing memory architectures, a row typically contains several interleaved pages or it may constitute one page. All memory elements of a page will be read or programmed together.

In flash memory systems, erase operation may take as much as an order of magnitude longer than read and program operations. Thus, it is desirable to have the erase block of substantial size. In this way, the erase time is amortized over a large aggregate of memory cells.

The nature of flash memory predicates that data must be written to an erased memory location. If data of a certain logical address from a host is to be updated, one way is rewrite the update data in the same physical memory location. That is, the logical to physical address mapping is unchanged. However, this will mean the entire erase block contain that physical location will have to be first erased and then rewritten with the updated data. This method of update is inefficient, as it requires an entire erase block to be erased and rewritten, especially if the data to be updated only occupies a small portion of the erase block. It will also result in a higher frequency of erase recycling of the memory block, which is undesirable in view of the limited endurance of this type of memory device.

Data communicated through external interfaces of host systems, memory systems and other electronic systems are addressed and mapped into the physical locations of a flash memory system. Typically, addresses of data files generated or received by the system are mapped into distinct ranges of a continuous logical address space established for the system in terms of logical blocks of data (hereinafter the "LBA interface"). The extent of the address space is typically sufficient to cover the full range of addresses that the system is capable of handling. In one example, magnetic disk storage drives communicate with computers or other host systems through such a logical address space. This address space has an extent sufficient to address the entire data storage capacity of the disk drive.

Flash memory systems are most commonly provided in the form of a memory card or flash drive that is removably connected with a variety of hosts such as a personal computer, a camera or the like, but may also be embedded within such host systems. When writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A controller within the memory system translates logical addresses received from the host into physical addresses within the Memory array, where the data are actually stored, and then keeps track of these address translations. The data storage capacity of the memory system is at least as large as the amount of data that is addressable over the entire logical address space defined for the memory system.

In current commercial flash memory systems, the size of the erase unit has been increased to a block of enough memory cells to store multiple sectors of data. Indeed, many pages of data are stored in one block, and a page may store multiple sectors of data. Further, two or more blocks are often operated together as metablocks, and the pages of such blocks logically linked together as metapages. A page or metapage of data are written and read together, which can include many sectors of data, thus increasing the parallelism of the operation. Along with such large capacity operating units the challenge is to operate them efficiently.

For ease of explanation, unless otherwise specified, it is intended that the term "block" as used herein refer to either the block unit of erase or a multiple block "metablock," depending upon whether metablocks are being used in a specific system. Similarly, reference to a "page" herein may refer to a unit of programming within a single block or a "metapage" within a metablock, depending upon the system configuration.

When the currently prevalent LBA interface to the memory system is used, files generated by a host to which the memory is connected are assigned unique addresses within the logical address space of the interface. The memory system then commonly maps data between the logical address space and pages of the physical blocks of memory. The memory system keeps track of how the logical address space is mapped into the physical memory but the host is unaware of this. The host keeps track of the addresses of its data files within the logical address space but the memory system operates with little or no knowledge of this mapping.

Another problem with managing flash memory system has to do with system control and directory data. The data is produced and accessed during the course of various memory operations. Thus, its efficient handling and ready access will directly impact performance. It would be desirable to maintain this type of data in flash memory because flash memory is meant for storage and is nonvolatile. However, with an intervening file management system between the controller and the flash memory, the data can not be accessed as directly. Also, system control and directory data tends to be active and fragmented, which is not conducive to storing in a system with large size block erase. Conventionally, this type of data is set up in the controller RAM, thereby allowing direct access by the controller. After the memory device is powered up, a process of initialization enables the flash memory to be scanned in order to compile the necessary system control and directory information to be placed in the controller RAM. This process takes time and requires controller RAM capacity, all the more so with ever increasing flash memory capacity.

U.S. Pat. No. 6,567,307 discloses a method of dealing with sector updates among large erase block including recording the update data in multiple erase blocks acting as scratch pad and eventually consolidating the valid sectors among the various blocks and rewriting the sectors after rearranging them in logically sequential order. In this way, a block needs not be erased and rewritten at every slightest update.

WO 03/027828 and WO 00/49488 both disclose a memory system dealing with updates among large erase block including partitioning the logical sector addresses in zones. A small zone of logical address range is reserved for active system control data separate from another zone for user data. In this way, manipulation of the system control data in its own zone will not interact with the associated user data in another zone. Updates are at the logical sector level and a write pointer points to the corresponding physical sectors in a block to be written. The mapping information is buffered in RAM and eventually stored in a sector allocation table in the main memory. The latest version of a logical sector will obsolete all previous versions among existing blocks, which become partially obsolete. Garbage collection is performed to keep partially obsolete blocks to an acceptable number.

Prior art systems tend to have the update data distributed over many blocks or the update data may render many existing blocks partially obsolete. The result often is a large amount of garbage collection necessary for the partially obsolete blocks, which is inefficient and causes premature aging of the memory. Also, there is no systematic and efficient way of dealing with sequential update as compared to non-sequential update.

Flash memory with a block management system employing a mixture of sequential and chaotic update blocks is disclosed in United States Patent Publication No. US-2005-0144365-A1 dated Jun. 30, 2005, the entire disclosure of which is incorporated herein by reference.

Prior art has disclosed flash memory systems operating with a cache and operating in mixed MLC (multi-level cell) and SLC (single-level cell) modes and with the SLC memory operating as a dedicated cache. However, the cache disclosed is mainly to buffer the data between a fast host and a slower MLC memory and for accumulation to write to a block. These systems mostly treat the cache memory at a high level as storage and ignoring the underlying low level operating considerations of the block structure and its update scheme. The following publications are examples of these prior art.

Using RAM in a write cache operating with a flash memory has been disclosed in U.S. Pat. No. 5,936,971 to Harari et al.

Partitioning the memory into two portions one operating in binary and the other in MLC has been disclosed in U.S. Pat. No. 5,930,167 to Lee et al and U.S. Pat. No. 6,456,528 to Chen, the entire disclosure of which is incorporated therein by reference.

United States Patent Publication Number: Publication Number: US-2007-0061502-A1 on Mar. 15, 2007 and US-2007-0283081-A1 dated Dec. 6, 2007 by Lasser both disclose a flash memory operating in mixed MLC and SLC modes. A specific portion of the memory is always allocated to operate in SLC mode and to serve as a dedicated cache.

In such memory system that are arranged for dealing with data in large blocks, one problem that occurs is in how to handle the situation a large number of short host writes of data fragments. Therefore there is a general need for high capacity and high performance non-volatile memory. In particular, there is a need to have a high capacity nonvolatile memory able to conduct memory operations in large blocks without the aforementioned problems.

SUMMARY OF THE INVENTION

According to a general aspect of the invention, a method of operating a memory system is presented. The memory system includes a memory circuit having an array of non-volatile memory cells and a controller circuit, where the controller oversees the transfer of user data between a host and the memory array and manages the storage of user data on the memory array. The controller receives from the host one or more segments of user data identified by a respective logical address and assigns a respective physical address in a first block of the memory array to each of the segments of user data. The controller maintains a mapping of the correspondence between the respective logical and physical addresses for each of the segments of user data. A first set of one or more of the segments of user data are then written to the corresponding assigned physical addresses of the memory array and the logical to physical mapping are written for the first set of segments of user data to the first block. A data consolidation operation is then performed. The consolidation operation includes consolidating segments of the first set of segments of user data from the first block into a second block and writing the logical to physical mapping for the consolidated segments of the first set of segments to a third block dedicated to storing logical to physical mappings.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

Memory System

FIG. 1 to FIG. 7 provide example memory systems in which the various aspects of the present invention may be implemented or illustrated.

FIG. 8 to FIG. 11 illustrate one memory and block architecture for implementing the various aspects of the present invention.

Figure 1:
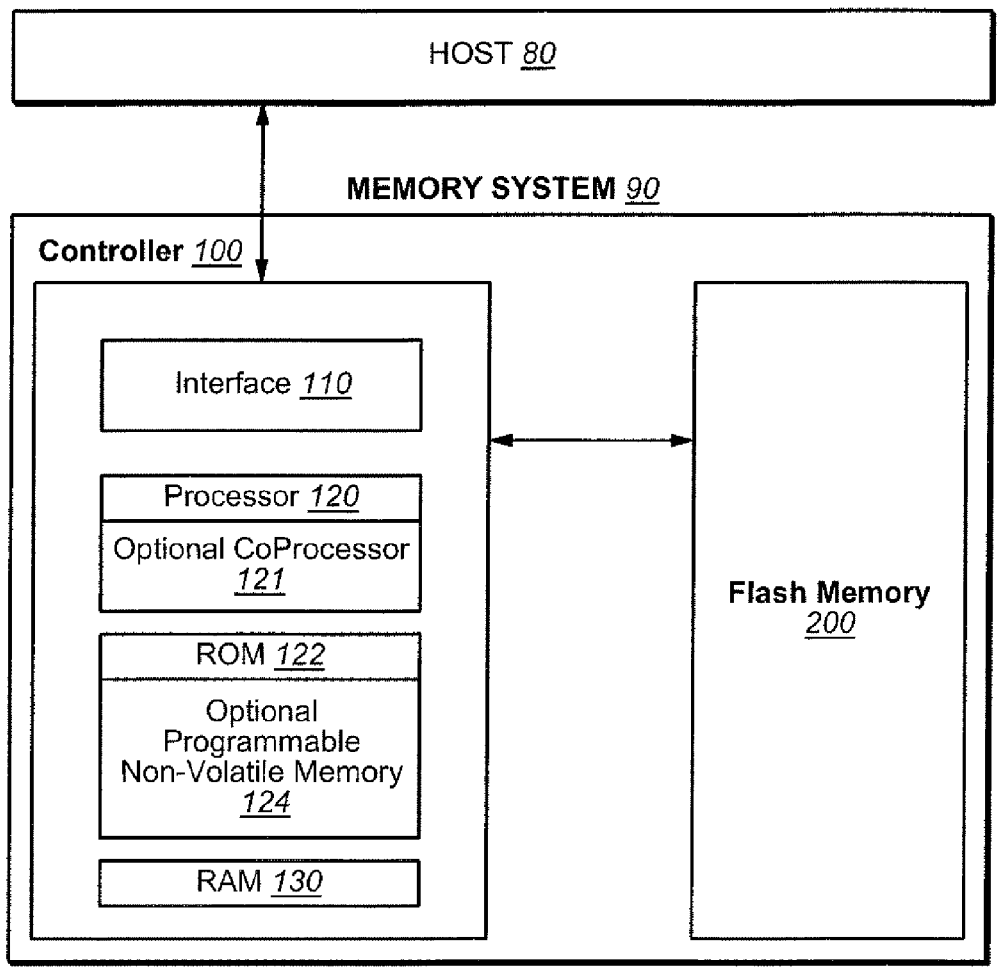
FIG. 1 illustrates schematically the main hardware components of a memory system suitable for implementing the present invention.

FIG. 1 illustrates schematically the main hardware components of a memory system suitable for implementing the present invention. The memory system 90 typically operates with a host 80 through a host interface. The memory system is typically in the form of a memory card or an embedded memory system. The memory system 90 includes a memory 200 whose operations are controlled by a controller 100. The memory 200 comprises of one or more array of non-volatile memory cells distributed over one or more integrated circuit chip. The controller 100 includes an interface 110, a processor 120, an optional coprocessor 121, ROM 122 (read-only-memory), RAM 130 (random access memory) and optionally programmable nonvolatile memory 124. The interface 110 has one component interfacing the controller to a host and another component interfacing to the memory 200. Firmware stored in nonvolatile ROM 122 and/or the optional nonvolatile memory 124 provides codes for the processor 120 to implement the functions of the controller 100. Error correction codes may be processed by the processor 120 or the optional coprocessor 121. In an alternative embodiment, the controller 100 is implemented by a state machine (not shown.) In yet another embodiment, the controller 100 is implemented within the host.

Physical Memory Structure

Figure 2:
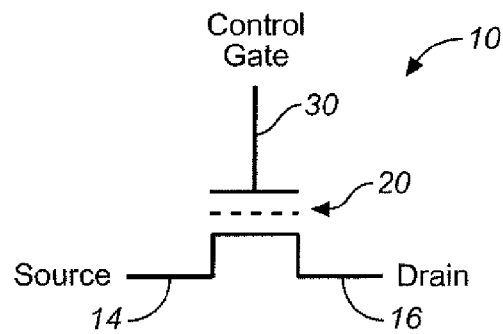
FIG. 2 illustrates schematically a non-volatile memory cell.

FIG. 2 illustrates schematically a non-volatile memory cell. The memory cell 10 can be implemented by a field-effect transistor having a charge storage unit 20, such as a floating gate or a dielectric layer. The memory cell 10 also includes a source 14, a drain 16, and a control gate 30.

There are many commercially successful non-volatile solid-state memory devices being used today. These memory devices may employ different types of memory cells, each type having one or more charge storage element.

Typical non-volatile memory cells include EEPROM and flash EEPROM. Examples of EEPROM cells and methods of manufacturing them are given in U.S. Pat. No. 5,595,924. Examples of flash EEPROM cells, their uses in memory systems and methods of manufacturing them are given in U.S. Pat. Nos. 5,070,032, 5,095,344, 5,315,541, 5,343,063, 5,661,053, 5,313,421 and 6,222,762. In particular, examples of memory devices with NAND cell structures are described in U.S. Pat. Nos. 5,570,315, 5,903,495, 6,046,935. Also, examples of memory devices utilizing dielectric storage element have been described by Eitan et al., "NROM: A Novel Localized Trapping, 2-Bit Nonvolatile Memory Cell," IEEE Electron Device Letters, vol. 21, no. 11, November 2000, pp. 543-545, and in U.S. Pat. Nos. 5,768,192 and 6,011,725.

In practice, the memory state of a cell is usually read by sensing the conduction current across the source and drain electrodes of the cell when a reference voltage is applied to the control gate. Thus, for each given charge on the floating gate of a cell, a corresponding conduction current with respect to a fixed reference control gate voltage may be detected. Similarly, the range of charge programmable onto the floating gate defines a corresponding threshold voltage window or a corresponding conduction current window.

Alternatively, instead of detecting the conduction current among a partitioned current window, it is possible to set the threshold voltage for a given memory state under test at the control gate and detect if the conduction current is lower or higher than a threshold current. In one implementation the detection of the conduction current relative to a threshold current is accomplished by examining the rate the conduction current is discharging through the capacitance of the bit line.

Figure 3:
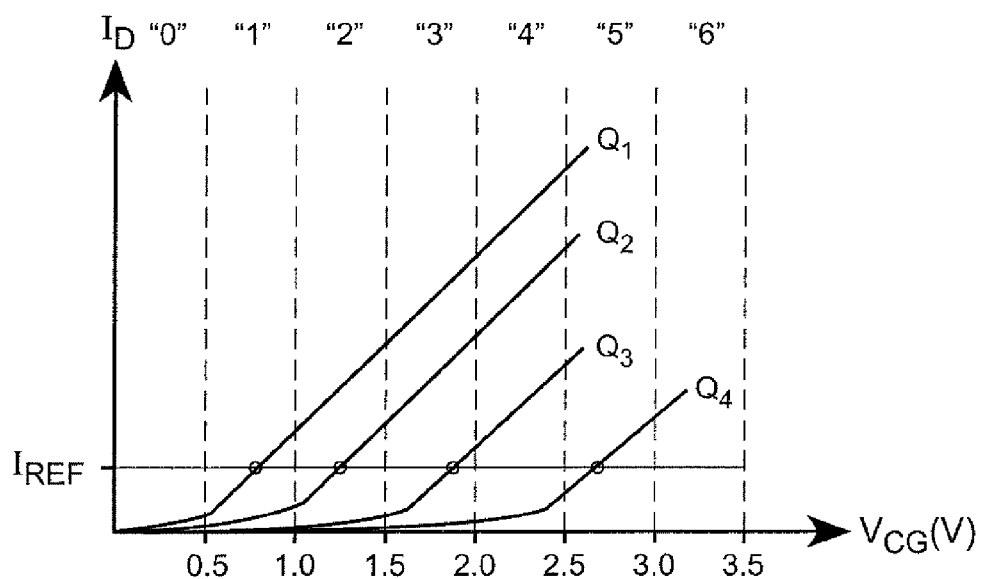
FIG. 3 illustrates the relation between the source-drain current $I_D$ and the control gate voltage $V_{CG}$ for four different charges Q1-Q4 that the floating gate may be selectively storing at any one time.

FIG. 3 illustrates the relation between the source-drain current $I_D$ and the control gate voltage $V_{CG}$ for four different charges Q1-Q4 that the floating gate may be selectively storing at any one time. The four solid $I_D$ versus $V_{CG}$ curves represent four possible charge levels that can be programmed on a floating gate of a memory cell, respectively corresponding to four possible memory states. As an example, the threshold voltage window of a population of cells may range from 0.5V to 3.5V. Seven possible memory states "0", "1", "2", "3", "4", "5", "6", respectively representing one erased and six programmed states may be demarcated by partitioning the threshold window into five regions in interval of 0.5V each. For example, if a reference current, IREF of 2 μA is used as shown, then the cell programmed with Q1 may be considered to be in a memory state "1" since its curve intersects with $I_{REF}$ in the region of the threshold window demarcated by VCG=0.5V and 1.0V. Similarly, Q4 is in a memory state "5".

As can be seen from the description above, the more states a memory cell is made to store, the more finely divided is its threshold window. For example, a memory device may have memory cells having a threshold window that ranges from −1.5V to 5V. This provides a maximum width of 6.5V. If the memory cell is to store 16 states, each state may occupy from 200 mV to 300 mV in the threshold window. This will require higher precision in programming and reading operations in order to be able to achieve the required resolution.

Figure 4A:
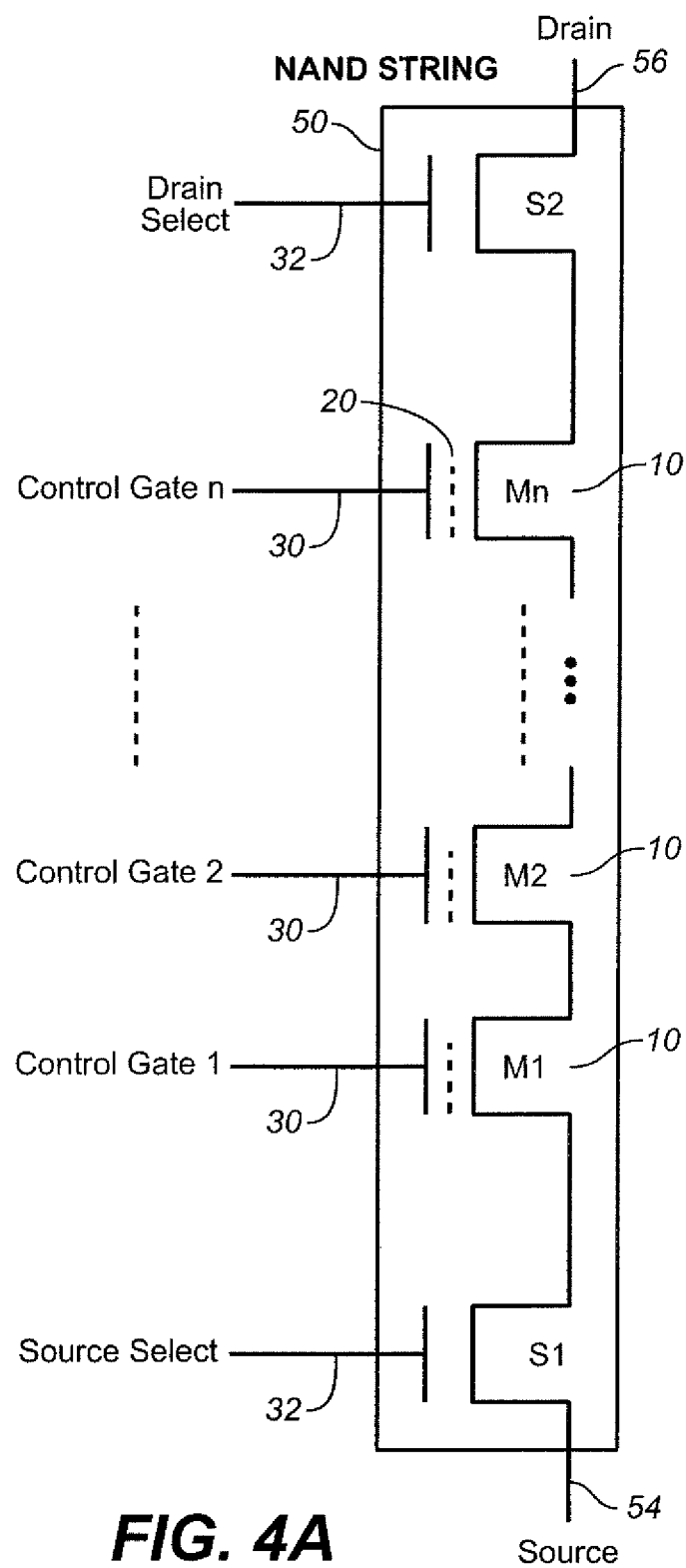
FIG. 4A illustrates schematically a string of memory cells organized into an NAND string.

FIG. 4A illustrates schematically a string of memory cells organized into an NAND string. An NAND string 50 comprises of a series of memory transistors M1, M2, ... Mn (e.g., n=4, 8, 16 or higher) daisy-chained by their sources and drains. A pair of select transistors S1, S2 controls the memory transistors chain's connection to the external via the NAND string's source terminal 54 and drain terminal 56 respectively. In a memory array, when the source select transistor S1 is turned on, the source terminal is coupled to a source line (see FIG. 4B). Similarly, when the drain select transistor S2 is turned on, the drain terminal of the NAND string is coupled to a bit line of the memory array. Each memory transistor 10 in the chain acts as a memory cell. It has a charge storage element 20 to store a given amount of charge so as to represent an intended memory state. A control gate 30 of each memory transistor allows control over read and write operations. As will be seen in FIG. 4B, the control gates 30 of corresponding memory transistors of a row of NAND string are all connected to the same word line. Similarly, a control gate 32 of each of the select transistors S1, S2 provides control access to the NAND string via its source terminal 54 and drain terminal 56 respectively. Likewise, the control gates 32 of corresponding select transistors of a row of NAND string are all connected to the same select line.

When an addressed memory transistor 10 within an NAND string is read or is verified during programming, its control gate 30 is supplied with an appropriate voltage. At the same time, the rest of the non-addressed memory transistors in the NAND string 50 are fully turned on by application of sufficient voltage on their control gates. In this way, a conductive path is effective created from the source of the individual memory transistor to the source terminal 54 of the NAND string and likewise for the drain of the individual memory transistor to the drain terminal 56 of the cell. Memory devices with such NAND string structures are described in U.S. Pat. Nos. 5,570,315, 5,903,495, 6,046,935.

Figure 4B:
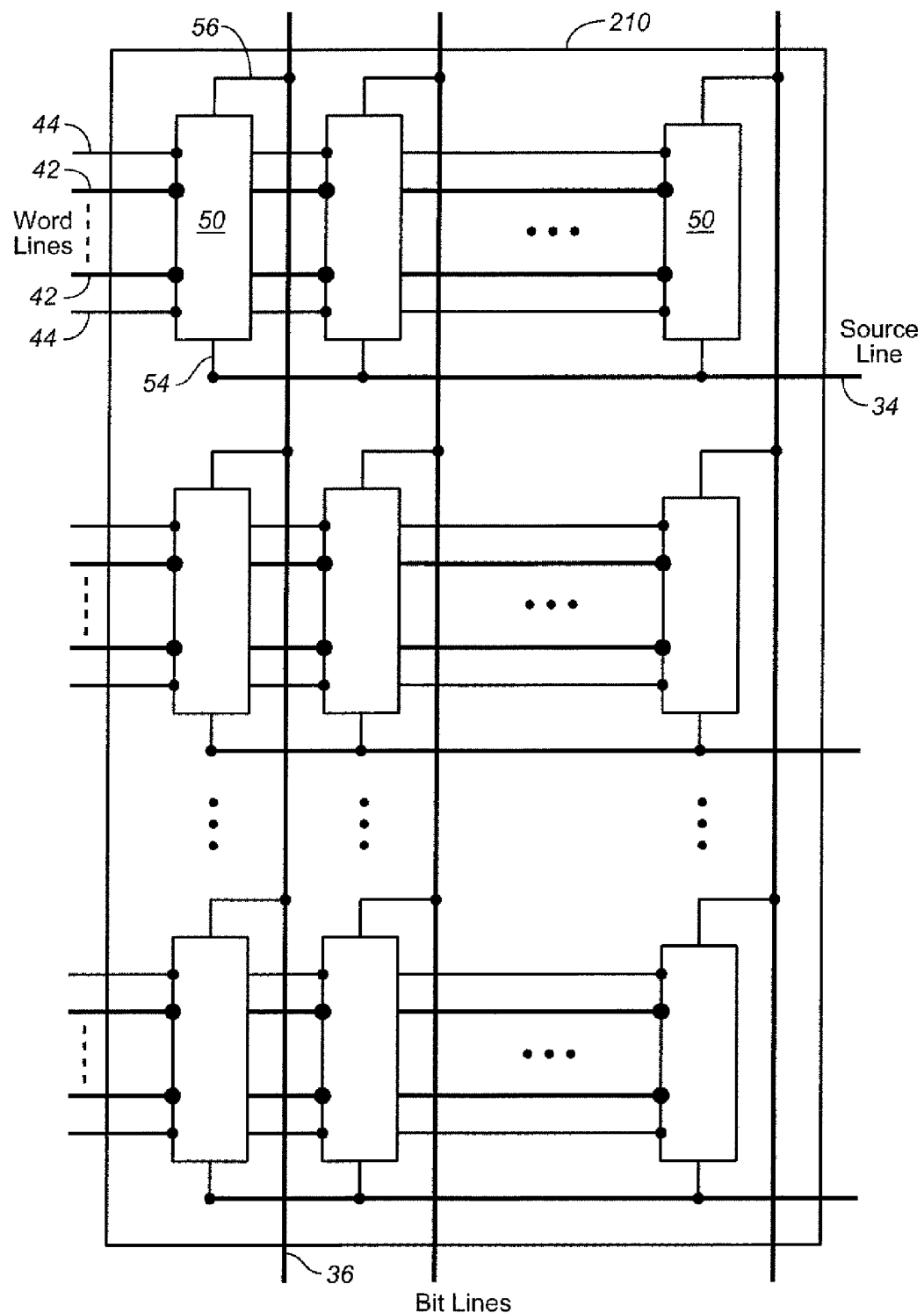
FIG. 4B illustrates an example of an NAND array 210 of memory cells, constituted from NAND strings 50 such as that shown in FIG. 4A.

FIG. 4B illustrates an example of an NAND array 210 of memory cells, constituted from NAND strings 50 such as that shown in FIG. 4A. Along each column of NAND strings, a bit line such as bit line 36 is coupled to the drain terminal 56 of each NAND string. Along each bank of NAND strings, a source line such as source line 34 is couple to the source terminals 54 of each NAND string. Also the control gates along a row of memory cells in a bank of NAND strings are connected to a word line such as word line 42. The control gates along a row of select transistors in a bank of NAND strings are connected to a select line such as select line 44. An entire row of memory cells in a bank of NAND strings can be addressed by appropriate voltages on the word lines and select lines of the bank of NAND strings. When a memory transistor within a NAND string is being read, the remaining memory transistors in the string are turned on hard via their associated word lines so that the current flowing through the string is essentially dependent upon the level of charge stored in the cell being read.

Figure 5:
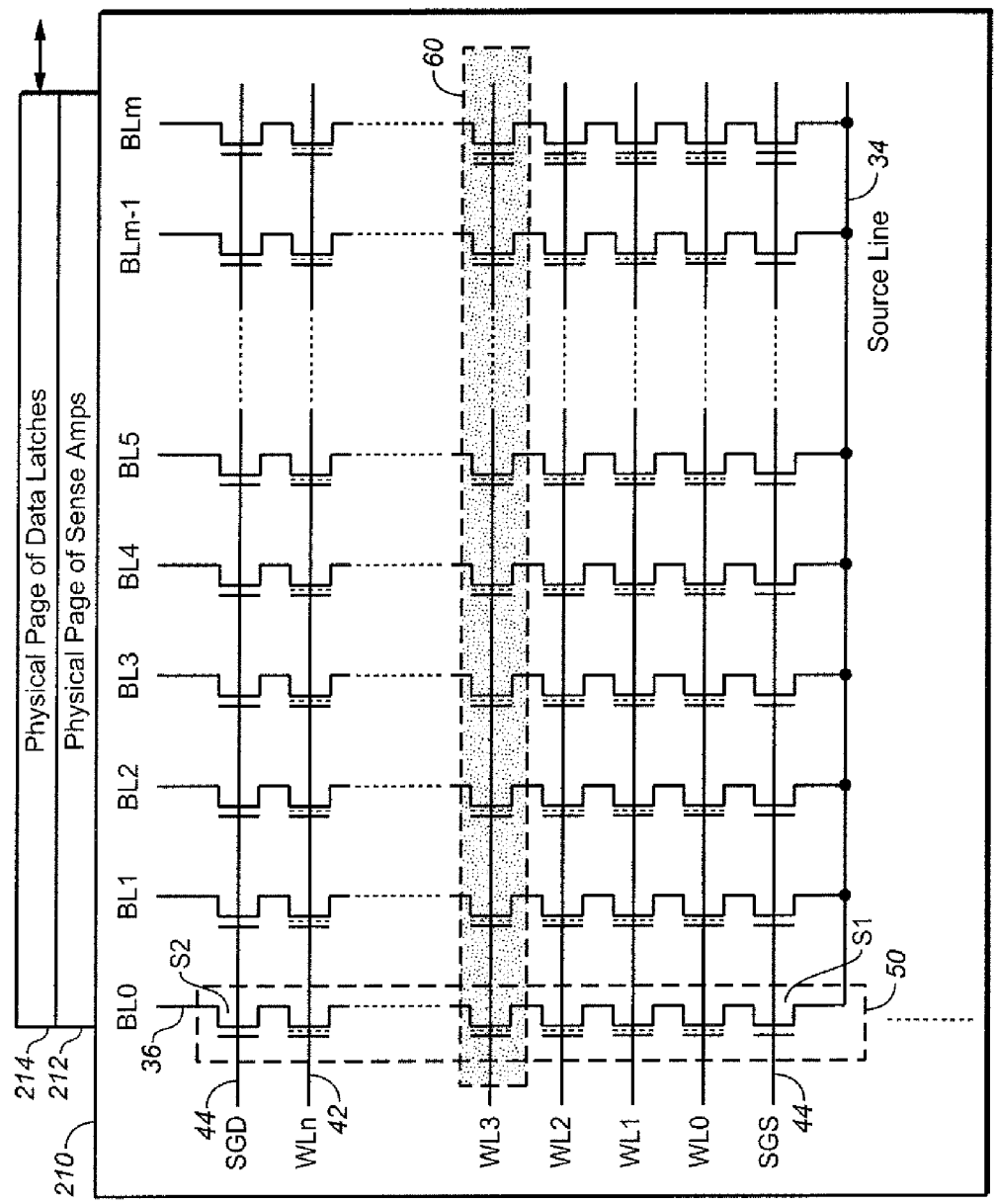
FIG. 5 illustrates a page of memory cells, organized for example in the NAND configuration, being sensed or programmed in parallel.

FIG. 5 illustrates a page of memory cells, organized for example in the NAND configuration, being sensed or programmed in parallel. FIG. 5 essentially shows a bank of NAND strings 50 in the memory array 210 of FIG. 4B, where the detail of each NAND string is shown explicitly as in FIG. 4A. A "page" such as the page 60, is a group of memory cells enabled to be sensed or programmed in parallel. This is accomplished by a corresponding page of sense amplifiers 212. The sensed results are latches in a corresponding set of latches 214. Each sense amplifier can be coupled to a NAND string via a bit line. The page is enabled by the control gates of the cells of the page connected in common to a word line 42 and each cell accessible by a sense amplifier accessible via a bit line 36. As an example, when respectively sensing or programming the page of cells 60, a sensing voltage or a programming voltage is respectively applied to the common word line WL3 together with appropriate voltages on the bit lines.

Physical Organization of the Memory

One important difference between flash memory and of type of memory is that a cell must be programmed from the erased state. That is the floating gate must first be emptied of charge. Programming then adds a desired amount of charge back to the floating gate. It does not support removing a portion of the charge from the floating to go from a more programmed state to a lesser one. This means that update data cannot overwrite existing one and must be written to a previous unwritten location.

Furthermore erasing is to empty all the charges from the floating gate and generally takes appreciably time. For that reason, it will be cumbersome and very slow to erase cell by cell or even page by page. In practice, the array of memory cells is divided into a large number of blocks of memory cells. As is common for flash EEPROM systems, the block is the unit of erase. That is, each block contains the minimum number of memory cells that are erased together. While aggregating a large number of cells in a block to be erased in parallel will improve erase performance, a large size block also entails dealing with a larger number of update and obsolete data. Just before the block is erased, a garbage collection is required to salvage the non-obsolete data in the block.

Each block is typically divided into a number of pages. A page is a unit of programming or reading. In one embodiment, the individual pages may be divided into segments and the segments may contain the fewest number of cells that are written at one time as a basic programming operation. One or more pages of data are typically stored in one row of memory cells. A page can store one or more sectors. A sector includes user data and overhead data. Multiple blocks and pages distributed across multiple arrays can also be operated together as metablocks and metapages. If they are distributed over multiple chips, they can be operated together as megablocks and megapage.

Examples of Multi-Level Cell ("MLC") Memory Partitioning

A nonvolatile memory in which the memory cells each stores multiple bits of data has already been described in connection with FIG. 3. A particular example is a memory formed from an array of field-effect transistors, each having a charge storage layer between its channel region and its control gate. The charge storage layer or unit can store a range of charges, giving rise to a range of threshold voltages for each field-effect transistor. The range of possible threshold voltages spans a threshold window. When the threshold window is partitioned into multiple sub-ranges or zones of threshold voltages, each resolvable zone is used to represent a different memory states for a memory cell. The multiple memory states can be coded by one or more binary bits. For example, a memory cell partitioned into four zones can support four states which can be coded as 2-bit data. Similarly, a memory cell partitioned into eight zones can support eight memory states which can be coded as 3-bit data, etc.

All-Bit, Full-Sequence MLC Programming

Figure 6:
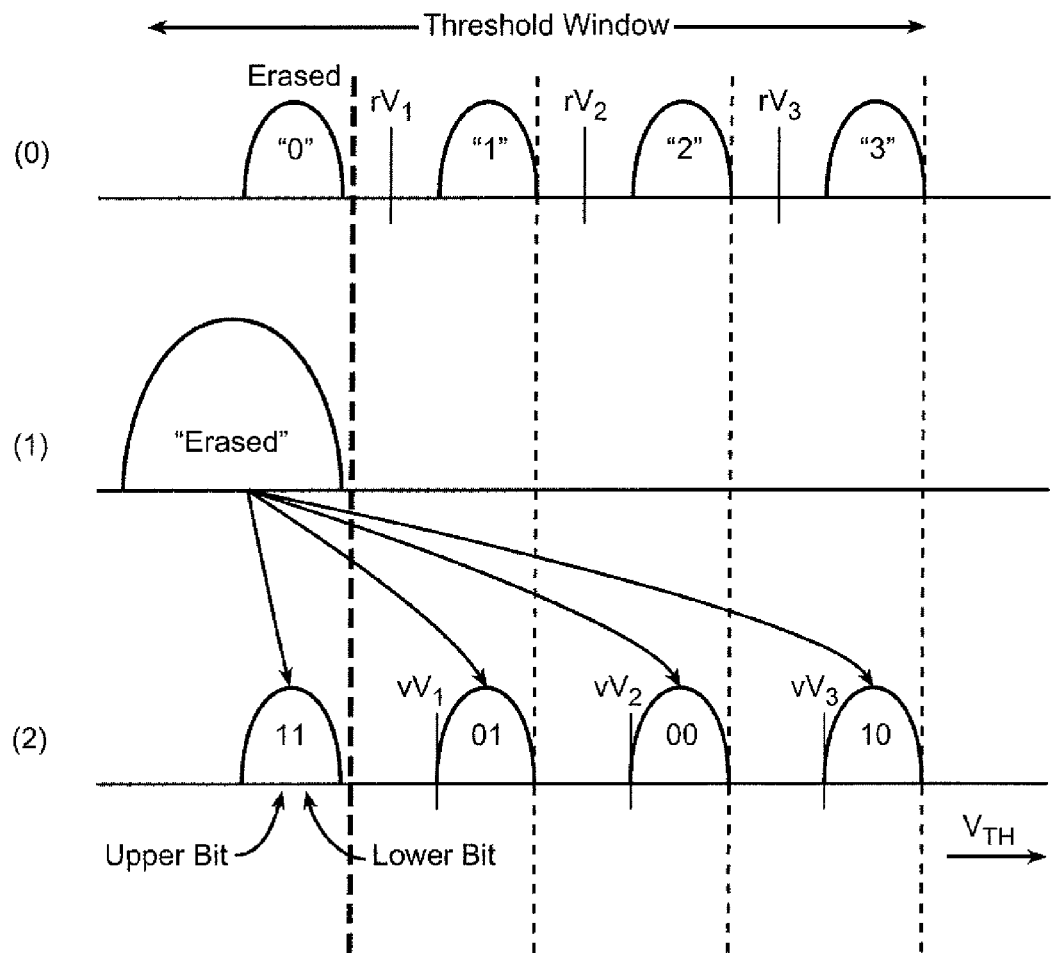
FIGS. 6(0)-6(2) illustrate an example of programming a population of 4-state memory cells.

FIGS. 6(0)-6(2) illustrate an example of programming a population of 4-state memory cells. FIG. 6(0) illustrates the population of memory cells programmable into four distinct distributions of threshold voltages respectively representing memory states "0", "1", "2" and "3". FIG. 6(1) illustrates the initial distribution of "erased" threshold voltages for an erased memory. FIG. 6(2) illustrates an example of the memory after many of the memory cells have been programmed. Essentially, a cell initially has an "erased" threshold voltage and programming will move it to a higher value into one of the three zones demarcated by verify levels $vV_1$, $vV_2$ and $vV_3$. In this way, each memory cell can be programmed to one of the three programmed state "1", "2" and "3" or remain un-programmed in the "erased" state. As the memory gets more programming, the initial distribution of the "erased" state as shown in FIG. 6(1) will become narrower and the erased state is represented by the "0" state.

A 2-bit code having a lower bit and an upper bit can be used to represent each of the four memory states. For example, the "0", "1", "2" and "3" states are respectively represented by "11", "01", "00" and '10". The 2-bit data may be read from the memory by sensing in "full-sequence" mode where the two bits are sensed together by sensing relative to the read demarcation threshold values $rV_1$, $rV_2$ and $rV_3$ in three sub-passes respectively.

Bit-by-Bit MLC Programming and Reading

Figure 7A:
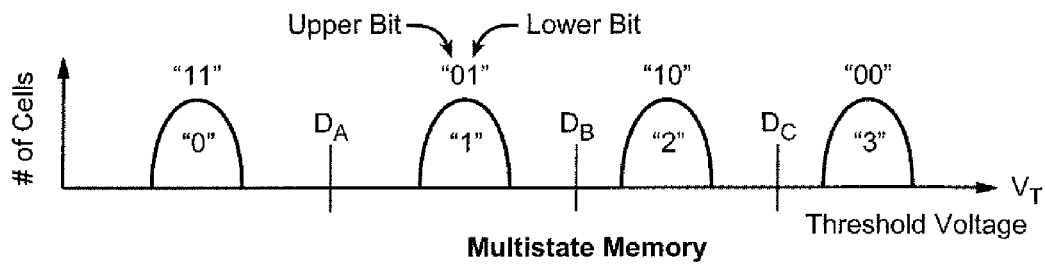
FIGS. 7A-7E illustrate the programming and reading of the 4-state memory encoded with a given 2-bit code.

FIGS. 7A-7E illustrate the programming and reading of the 4-state memory encoded with a given 2-bit code. FIG. 7A illustrates threshold voltage distributions of the 4-state memory array when each memory cell stores two bits of data using the 2-bit code. Such a 2-bit code has been disclosed in U.S. patent application Ser. No. 10/830,824 filed Apr. 24, 2004 by Li et al., entitled "NON-VOLATILE MEMORY AND CONTROL WITH IMPROVED PARTIAL PAGE PROGRAM CAPABILITY".

Figure 7B:
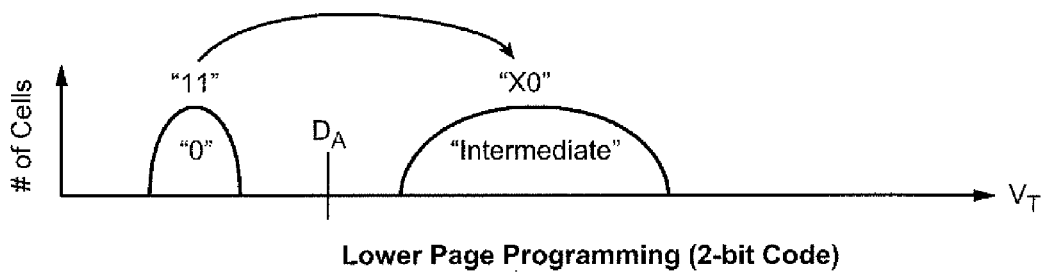

FIG. 7B illustrates the lower page programming (lower bit) in a 2-pass programming scheme using the 2-bit code. The fault-tolerant LM New code essentially avoids any upper page programming to transit through any intermediate states. Thus, the first pass lower page programming has the logical state (upper bit, lower bit)=(1, 1) transits to some intermediate state (x, 0) as represented by programming the "unprogrammed" memory state "0" to the "intermediate" state designated by (x, 0) with a programmed threshold voltage greater than $D_A$ but less than $D_C$.

Figure 7C:
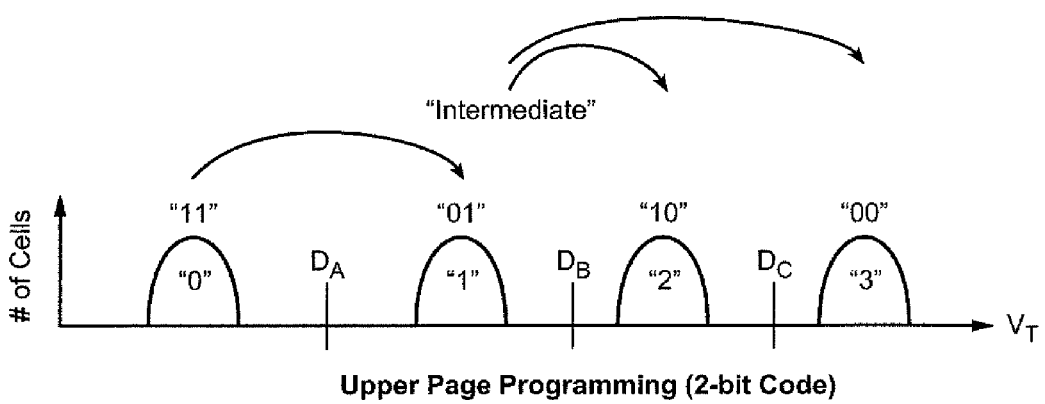

FIG. 7C illustrates the upper page programming (upper bit) in the 2-pass programming scheme using the 2-bit code. In the second pass of programming the upper page bit to "0", if the lower page bit is at "1", the logical state (1, 1) transits to (0, 1) as represented by programming the "unprogrammed" memory state "0" to "1". If the lower page bit is at "0", the logical state (0, 0) is obtained by programming from the "intermediate" state to "3". Similarly, if the upper page is to remain at "1", while the lower page has been programmed to "0", it will require a transition from the "intermediate" state to (1, 0) as represented by programming the "intermediate" state to "2".

Figure 7D:
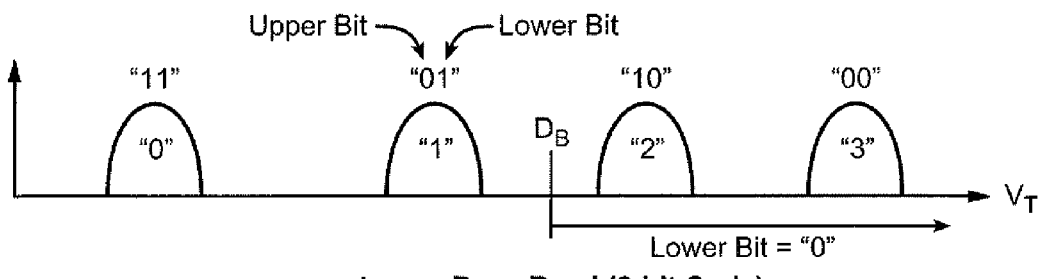

FIG. 7D illustrates the read operation that is required to discern the lower bit of the 4-state memory encoded with the 2-bit code. A readB operation is first performed to determine if the LM flag can be read. If so, the upper page has been programmed and the readB operation will yield the lower page data correctly. On the other hand, if the upper page has not yet been programmed, the lower page data will be read by a readA operation.

Figure 7E:
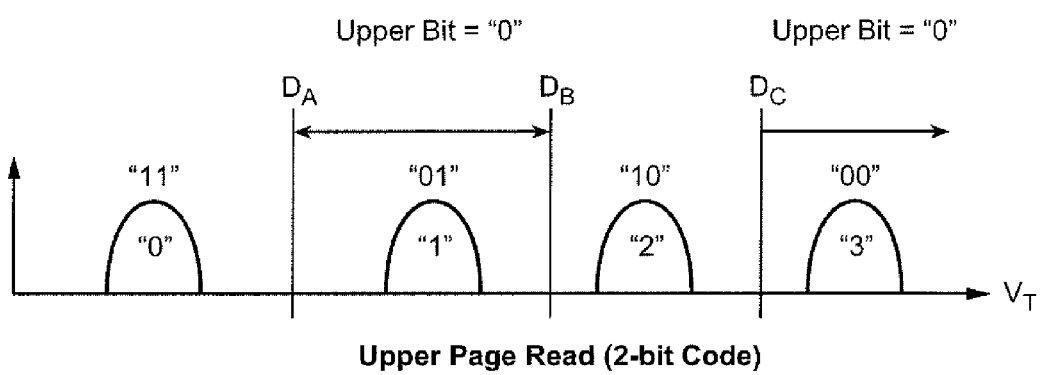

FIG. 7E illustrates the read operation that is required to discern the upper bit of the 4-state memory encoded with the 2-bit code. As is clear from the figure, the upper page read will require a 3-pass read of readA, readB and readC, respectively relative to the demarcation threshold voltages $D_A$, $D_B$ and $D_C$.

In the bit-by-bit scheme for a 2-bit memory, a physical page of memory cells will store two logical data pages, a lower data page corresponding to the lower bit and an upper data page corresponding to the upper bit.

Foggy-Fine Programming

Figure 7F:
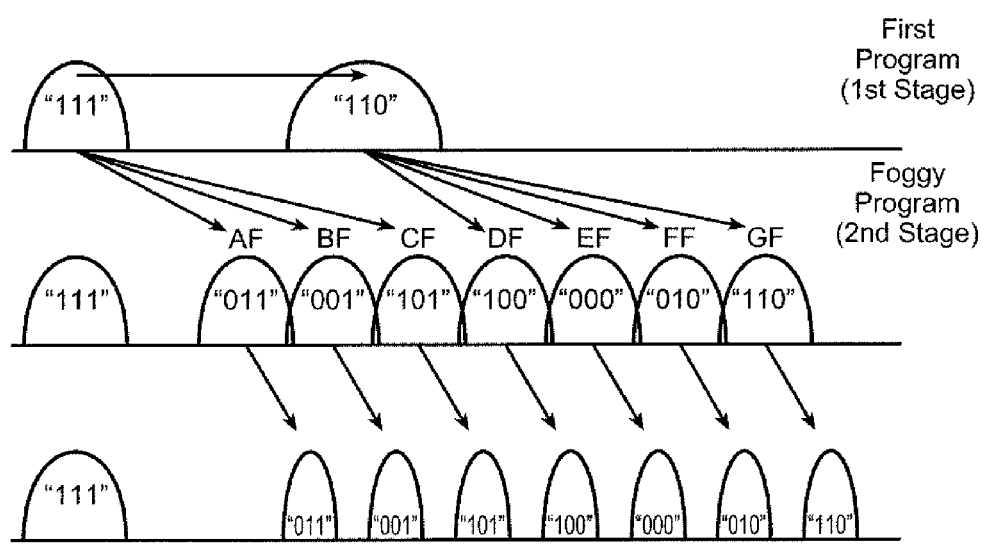
FIG. 7F illustrates a foggy-fine programming for an 8-state memory encoded with a given 3-bit code.

Another variation on multi-state programming employs a foggy-fine algorithm, as is illustrated in FIG. 7F for a 3-bit memory example. As shown there, this another multi-phase programming operation. A first programming operation is performed as shown in the top line, followed the foggy programming stage. The foggy phase is a full 3-bit programming operation from the first phase using all eight of the final states. At the end of the foggy, though, the data in these states is not yet fully resolved into well defined distributions for each of the 8 states (hence, the "foggy" name) and is not readily extractable.

As each cell is, however, programmed to near its eventual target state, the sort of neighboring cell to cell couplings, or "Yupin" effect, described in U.S. Pat. No. 6,870,768 are presenting most of their effect. Because of this, when the fine program phase (shown on the bottom line) is executed, these couplings have largely been factored in to this final phase so the cell distributions are more accurately resolved to their target ranges. More detail on these subjects is given in U.S. Pat. Nos. 6,870,768 and 6,657,891 and in the US patent application entitled "Atomic Program Sequence and Write Abort Detection" by Gorobets et al. having Ser. No. 12/642,740 and which is being filed concurrently herewith, and which presents a "diagonal" first-foggy-fine method.

Binary and MLC Memory Partitioning

FIG. 6 and FIG. 7 illustrate examples of a 2-bit (also referred to as "D2") memory. As can be seen, a D2 memory has its threshold range or window partitioned into 4 regions, designating 4 states. Similarly, in D3, each cell stores 3 bits (low, middle and upper bits) and there are 8 regions. In D4, there are 4 bits and 16 regions, etc. As the memory's finite threshold window is partitioned into more regions, the resolution and for programming and reading will necessarily become finer. Two issues arise as the memory cell is configured to store more bits.

First, programming or reading will be slower when the threshold of a cell must be more accurately programmed or read. In fact in practice the sensing time (needed in programming and reading) tends to increase as the square of the number of partitioning levels.

Secondly, flash memory has an endurance problem as it ages with use. When a cell is repeatedly programmed and erased, charges is shuttled in and out of the floating gate 20 (see FIG. 2) by tunneling across a dielectric. Each time some charges may become trapped in the dielectric and will modify the threshold of the cell. In fact over use, the threshold window will progressively narrow. Thus, MLC memory generally is designed with tradeoffs between capacity, performance and reliability.

Conversely, it will be seen for a binary memory, the memory's threshold window is only partitioned into two regions. This will allow a maximum margin of errors. Thus, binary partitioning while diminished in storage capacity will provide maximum performance and reliability.

The multi-pass, bit-by-bit programming and reading technique described in connection with FIG. 7 provides a smooth transition between MLC and binary partitioning. In this case, if the memory is programmed with only the lower bit, it is effectively a binary partitioned memory. While this approach does not fully optimize the range of the threshold window as in the case of a single-level cell ("SLC") memory, it has the advantage of using the same demarcation or sensing level as in the operations of the lower bit of the MLC memory. As will be described later, this approach allows a MLC memory to be "expropriated" for use as a binary memory, or vice versa. How it should be understood that MLC memory tends to have more stringent specification for usage.

Binary Memory and Partial Page Programming

The charge programmed into the charge storage element of one memory cell produces an electric field that perturbs the electric field of a neighboring memory cell. This will affect the characteristics of the neighboring memory cell which essentially is a field-effect transistor with a charge storage element. In particular, when sensed the memory cell will appear to have a higher threshold level (or more programmed) than when it is less perturbed.

In general, if a memory cell is program-verified under a first field environment and later is read again under a different field environment due to neighboring cells subsequently being programmed with different charges, the read accuracy may be affected due to coupling between neighboring floating gates in what is referred to as the "Yupin Effect". With ever higher integration in semiconductor memories, the perturbation of the electric field due to the stored charges between memory cells (Yupin effect) becomes increasing appreciable as the inter-cellular spacing shrinks.

The Bit-by-Bit MLC Programming technique described in connection with FIG. 7 above is designed to minimize program disturb from cells along the same word line. As can be seen from FIG. 7B, in a first of the two programming passes, the thresholds of the cells are moved at most half way up the threshold window. The effect of the first pass is overtaken by the final pass. In the final pass, the thresholds are only moved a quarter of the way. In other words, for D2, the charge difference among neighboring cells is limited to a quarter of its maximum. For D3, with three passes, the final pass will limit the charge difference to one-eighth of its maximum, However, the bit-by-bit multi-pass programming technique will be compromised by partial-page programming. A page is a group of memory cells, typically along a row or word line, that is programmed together as a unit. It is possible to program non overlapping portions of a page individually over multiple programming passes. However, owning to not all the cells of the page are programmed in a final pass together, it could create large difference in charges programmed among the cells after the page is done. Thus partial-page programming would result in more program disturb and would require a larger margin for sensing accuracy.

In the case the memory is configured as binary memory, the margin of operation is wider than that of MLC. In the preferred embodiment, the binary memory is configured to support partial-page programming in which non-overlapping portions of a page may be programmed individually in one of the multiple programming passes on the page. The programming and reading performance can be improved by operating with a page of large size: However, when the page size is much larger than the host's unit of write (typically a 512-byte sector), its usage will be inefficient. Operating with finer granularity than a page allows more efficient usage of such a page.

The example given has been between binary versus MLC. It should be understood that in general the same principles apply between a first memory with a first number of levels and a second memory with a second number of levels more than the first memory.

Logical and Physical Block Structures

Figure 8:
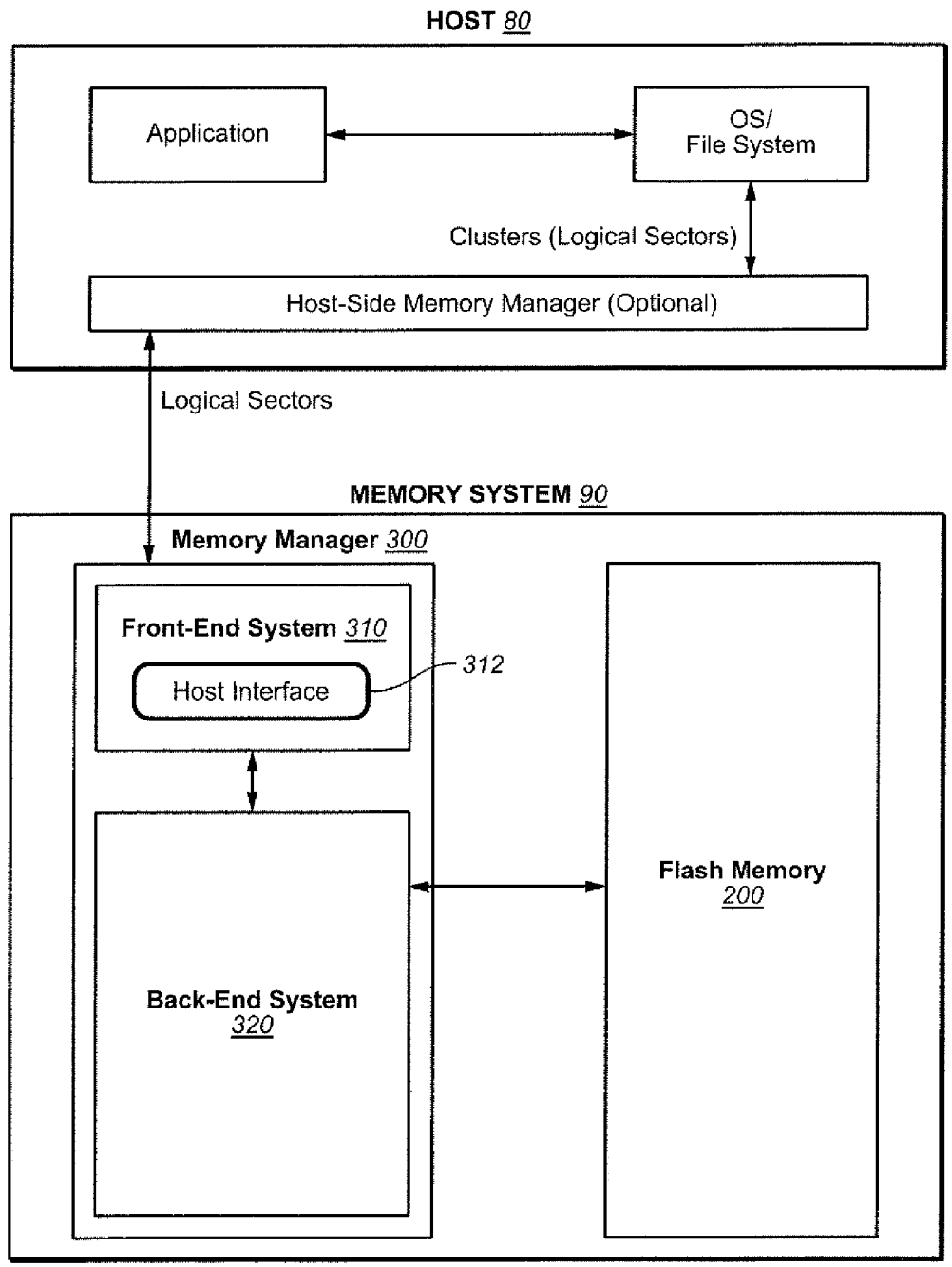
FIG. 8 illustrates the memory being managed by a memory manager with is a software component that resides in the controller.

FIG. 8 illustrates the memory being managed by a memory manager with is a software component that resides in the controller. The memory 200 is organized into blocks, each block of cells being a minimum unit of erase. Depending on implementation, the memory system may operate with even large units of erase formed by an aggregate of blocks into "metablocks" and also "megablocks". For convenience the description will refer to a unit of erase as a metablock although it will be understood that some systems operate with even larger unit of erase such as a "megablock" formed by an aggregate of metablocks.

The host 80 accesses the memory 200 when running an application under a file system or operating system. Typically, the host system addresses data in units of logical sectors where, for example, each sector may contain 512 bytes of data. Also, it is usual for the host to read or write to the memory system in unit of logical clusters, each consisting of one or more logical sectors. In some host systems, an optional host-side memory manager may exist to perform lower level memory management at the host. In most cases during read or write operations, the host 80 essentially issues a command to the memory system 90 to read or write a segment containing a string of logical sectors of data with contiguous addresses.

A memory-side memory manager 300 is implemented in the controller 100 of the memory system 90 to manage the storage and retrieval of the data of host logical sectors among metablocks of the flash memory 200. The memory manager comprises a front-end system 310 and a back-end system 320. The front-end system 310 includes a host interface 312. The back-end system 320 includes a number of software modules for managing erase, read and write operations of the metablocks. The memory manager also maintains system control data and directory data associated with its operations among the flash memory 200 and the controller RAM 130.

Figure 9:
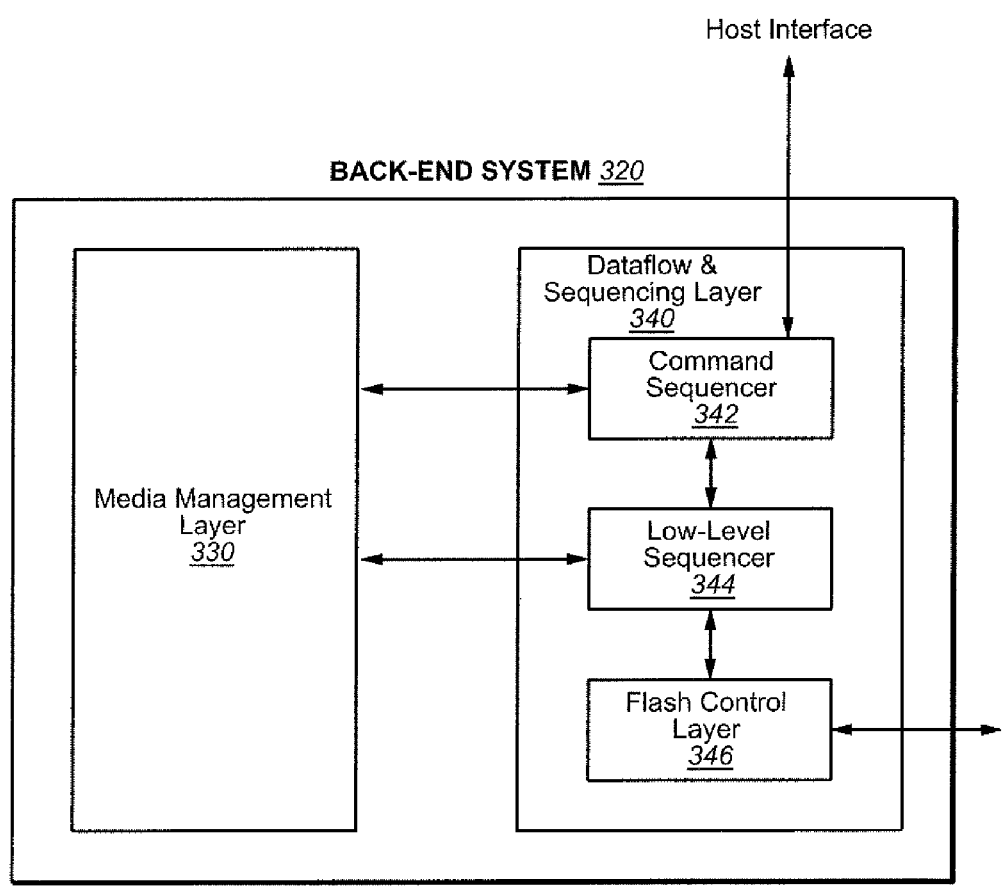
FIG. 9 illustrates the software modules of the back-end system.

FIG. 9 illustrates the software modules of the back-end system. The Back-End System mainly comprises two functional modules: a Media Management Layer 330 and a Dataflow and Sequencing Layer 340.

The media management layer 330 is responsible for the organization of logical data storage within a flash memory meta-block structure. More details will be provided later in the section on "Media management Layer".

The dataflow and sequencing layer 340 is responsible for the sequencing and transfer of sectors of data between a front-end system and a flash memory. This layer includes a command sequencer 342, a low-level sequencer 344 and a flash Control layer 346. More details will be provided later in the section on "Low Level System Spec".

The memory manager 300 is preferably implemented in the controller 100. It translates logical addresses received from the host into physical addresses within the memory array, where the data are actually stored, and then keeps track of these address translations.

Figure 10A:
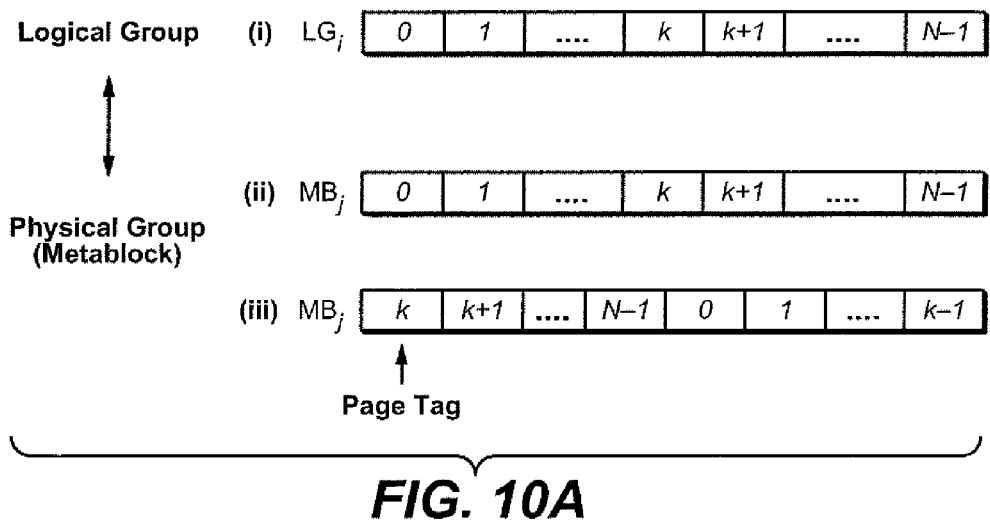
FIGS. 10A(i)-10A(iii) illustrate schematically the mapping between a logical group and a metablock.

FIGS. 10A(i)-10A(iii) illustrate schematically the mapping between a logical group and a metablock. The metablock of the physical memory has N physical sectors for storing N logical sectors of data of a logical group. FIG. 10A(i) shows the data from a logical group $LG_i$, where the logical sectors are in contiguous logical order 0, 1, . . . , N-1. FIG. 10A(ii) shows the same data being stored in the metablock in the same logical order. The metablock when stored in this manner is said to be "sequential." In general, the metablock may have data stored in a different order, in which case the metablock is said to be "non-sequential" or "chaotic."

There may be an offset between the lowest address of a logical group and the lowest address of the metablock to which it is mapped. In this case, logical sector address wraps round as a loop from bottom back to top of the logical group within the metablock. For example, in FIG. 10A(iii), the metablock stores in its first location beginning with the data of logical sector k. When the last logical sector N-1 is reached, it wraps around to sector 0 and finally storing data associated with logical sector k-1 in its last physical sector. In the preferred embodiment, a page tag is used to identify any offset, such as identifying the starting logical sector address of the data stored in the first physical sector of the metablock. Two blocks will be considered to have their logical sectors stored in similar order when they only differ by a page tag.

Figure 10B:
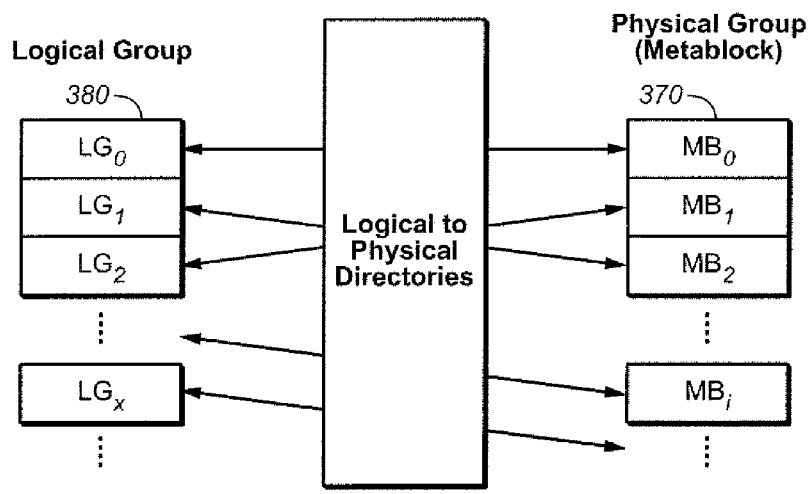
FIG. 10B illustrates schematically the mapping between logical groups and metablocks.

FIG. 10B illustrates schematically the mapping between logical groups and metablocks. Each logical group 380 is mapped to a unique metablock 370, except for a small number of logical groups in which data is currently being updated. After a logical group has been updated, it may be mapped to a different metablock. The mapping information is maintained in a set of logical to physical directories, which will be described in more detail later.

Memory Partitioned into Main and Binary Cache Portions

A number of memory system arrangements where the non-volatile memory includes both binary and multi-level sections will now be described. In a first of these, in a flash memory having an array of memory cells that are organized into a plurality of blocks, the cells in each block being erased together, the flash memory is partitioned into at least two portions. A first portion forms the main memory for storing mainly user data. Individual memory cells in the main memory being configured to store one or more bits of data in each cell. A second portion forms a cache for data to be written to the main memory. The memory cells in the cache portion are configured to store less bits of data in each cell than that of the main memory. Both the cache portion and the main memory portion operate under a block management system for which cache operation is optimized. A more detailed presentation of this material is developed in the following U.S. patent application or provisional application Nos. 12/348,819; 12/348,825; 12/348,891; 12/348,895; 12/348,899; and 61/142,620, all filed on Jan. 5, 2009; and Ser. Nos. 12/642,584; 12/642,611; U.S. Ser. Nos. 12/642,649; 12/642,728; and 12/642,740, all filed on Dec. 18, 2009.

In the preferred embodiment, individual cells in the cache portion are each configured to store one bit of data while the cells in the main memory portion each stores more than one bit of data. The cache portion then operates as a binary cache with faster and more robust write and read performances.

In the preferred embodiment, the cache portion is configured to allow finer granularity of writes than that for the main memory portion. The finer granularity is more compatible with the granularity of logical data units from a host write. Due to requirement to store sequentially the logical data units in the blocks of the main memory, smaller and chaotic fragments of logical units from a series of host writes can be buffered in the cache portion and later reassembly in sequential order to the blocks in the main memory portion.

In one aspect of the invention, the decision for the block management system to write data directly to the main portion or to the cache portion depends on a number of predefined conditions. The predefined conditions include the attributes and characteristics of the data to be written, the state of the blocks in the main memory portion and the state of the blocks in the cache portion.

The Binary Cache of the present system has the follows features and advantages: a) it increases burst write speed to the device; b) it allows data that is not aligned to pages or metapages to be efficiently written; c) it accumulates data for a logical group, to minimize the amount of data that must be relocated during garbage collection of a meta-block after the data has been archived to the meta-block; d) it stores data for a logical group in which frequent repeated writes occur, to avoid writing data for this logical group to the meta-block; and e) it buffers host data, to allow garbage collection of the meta-block to be distributed amongst multiple host busy periods.

Figure 11:
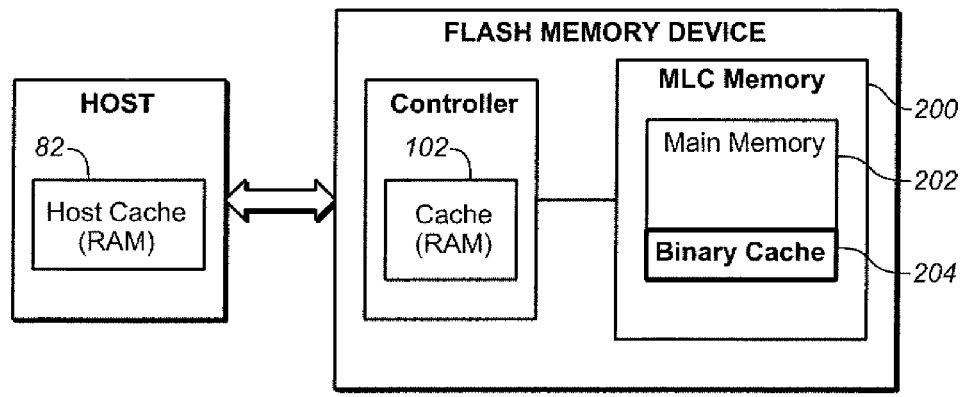
FIG. 11 illustrates a host operating with the flash memory device through a series of caches at different levels of the system.

FIG. 11 illustrates a host operating with the flash memory device through a series of caches at different levels of the system. A Cache is high-speed storage for temporarily storing data being passed between a high-speed and a slower-speed component of the system. Typically high-speed volatile RAM are employed as cache as in a host cache 82 and/or in a controller cache 102 of the memory controller. The non-volatile memory 200 is partitioned into two portions. The first portion 202 has the memory cells operating as a main memory for user data in either MLC or binary mode. The second portion 204 has the memory cells operating as a cache in a binary mode. Thus, the memory 200 is partitioned into a main memory 202 and a binary cache.

Techniques for Maintaining Logical to Physical Mapping Data

As discussed above, a memory system will store user data at a physical location in the non-volatile memory. The host will identify this data a logical address. In order to keep track of the user data, the system will need to keep track to the correspondence between the data as logically identified by the host and the physical location where it is stored. As logical data is updated, the logical to physical mapping is correspondingly updated. Keeping track of this information as the host writes multiple data fragments to the system can be quite complicated, particular for system that manage data using large data structure. This section will consider techniques for this, particularly in the context of a memory system that uses the sort of binary cache structure described in the preceding sections; and although the binary cache arrangement will serve as the exemplary embodiment, the following techniques generally applicable.

Storage of Address Tables

Memory storage systems usually handle short host writes by writing the data fragments to shared blocks in time order, as in the binary cache sort of arrangement described above. The address tables are usually stored in one of three ways. A first way is to store address tables in controller's RAM only. As RAM is volatile, the table will need to be reconstructed by scanning the memory after power cycle. For a memory of any appreciable size, this method is very limited due to a large amount of RAM required and the long scanning time to reconstruct the table.

A second approach is for address tables to be stored in non-volatile memory, but separately from data, in a dedicated block. This is a common approach but is not optimal for the cases of random short writes, as many additional programs of the address table add a significant performance penalty.

Another approach is for the address table to be stored in the same blocks as the user data. An advantage here is possibility to program data and the address table by the same programming operation. For example, as the data may often be just one 4 KB cluster, this can be written to the same page together with address table, otherwise the page, typically 8 KB, would be half-empty. In this approach, there is no penalty in performance or used capacity. There are, however, certain problems with this method. One is that, in random write scenarios, the obsolete capacity of the address tables can be much higher as the reclamation of that capacity may require unnecessary block compaction and additional coping of user data in the shared blocks. Another is that the address table can expand in size due to an increasing number of data elements for which it must account. Block compaction, such as those described in the nest section, can yield less than expected capacity, or none at all. In the extreme case, compaction can be impossible as the copied data with expanded table will not fit into a new block. To overcome this problem, the system will have to resort to additional back-to-back clean-up operations, such as eviction of data from binary cache and more compactions. This will result in unexpected long delays of command execution, seen by the host as a sudden long delay and drop in performance.

After some further discussion of the binary cache environment, techniques are presented for solving this last set of problems without compromising the advantages of the advantage of a using single program operation to update both user data and address tables.

Binary Cache Data Writes and BCI (Binary Cache Index) Writes

The exemplary embodiment is presented here presented here in the context of a memory system such as that of FIG. 11, which stores data in both binary and multi-state formats; for example, as data can typically be written more quickly and with less critical tolerances in binary form, a memory may initial write data in binary form as it is received from a host and later rewrite this data in a multi-state format for greater storage density. In such memories, some cells may be used in binary format with others used in multi-state format, or the same cells may be operated to store differing numbers of bits. More detail on such systems that use a binary cache portion and a multi-state portion are discussed in more detail in U.S. Pat. No. 6,456,528; US patent publication number 2009/0089481; and the following U.S. patent application Nos.: 61/142,620; 12/348,819; 12/348,825; 12/348,891; 12/348,895; 12/348,899; 12/642,584; 12/642,611; U.S. Ser. Nos. 12/642,649; 12/642,728; and 12/642,740. Some of the relevant details on binary cache operation are reviewed in the rest of this section, but more detail on the subject is found in these referenced documents.

Under the arrangement presented in the memory systems presented in these documents, the system stores user data and logical to physical mapping data, or indices, in the same physical memory block. The segments of user data stored in the binary cache often consists of fragments of logical group, although more general the segments can be a complete data set. The indices are built up in RAM on the controller and written to the non-volatile memory as required, normally when they become full. An index consists of a data store and a lookup table of all other valid indices. The binary cache index (BCI) data store contains a list of logical groups (LGs) and their fragments. If a LG has no fragments, then it will not exist in an index. LGs are sorted by incrementing logical order, fragments belonging to each LG are also sorted by increasing offset.

Figure 12:
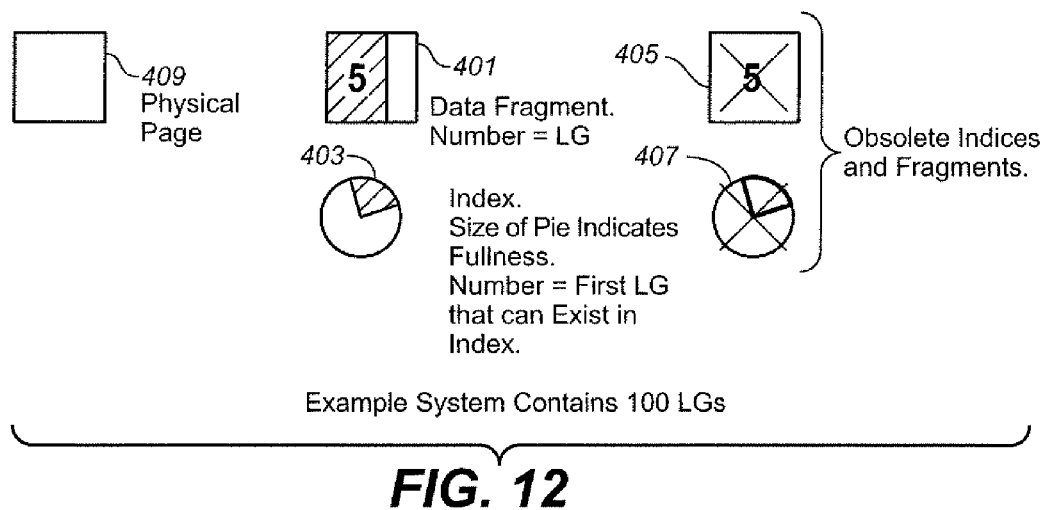
FIG. 12 illustrates the labeling convention of FIGS. 13-18.

The next several figures will follow the convention illustrated by FIG. 12. As shown at top left, each square 409 represents a physical page. When storing a data fragment, this will be shown as illustrate top center square 401, which in this case is partially filled, by data whose number indicates the logical group to which it belongs. (In this example, the number of logical groups will be taken as 100.) The logical to physical mapping information, or index, is shown by the circle 403 at bottom center, where the size colored portion wedge or portion of the pie corresponds to the fullness of the index and, when numbered, the number will indicate the first LG that will be found in the index. When such an index or portion of an index is written into a physical page of non-volatile memory that it shares with data, it will occupy the same square. Obsolete fragments and indices are indicated by being crossed out as shown at 405 and 407.

Figure 13:
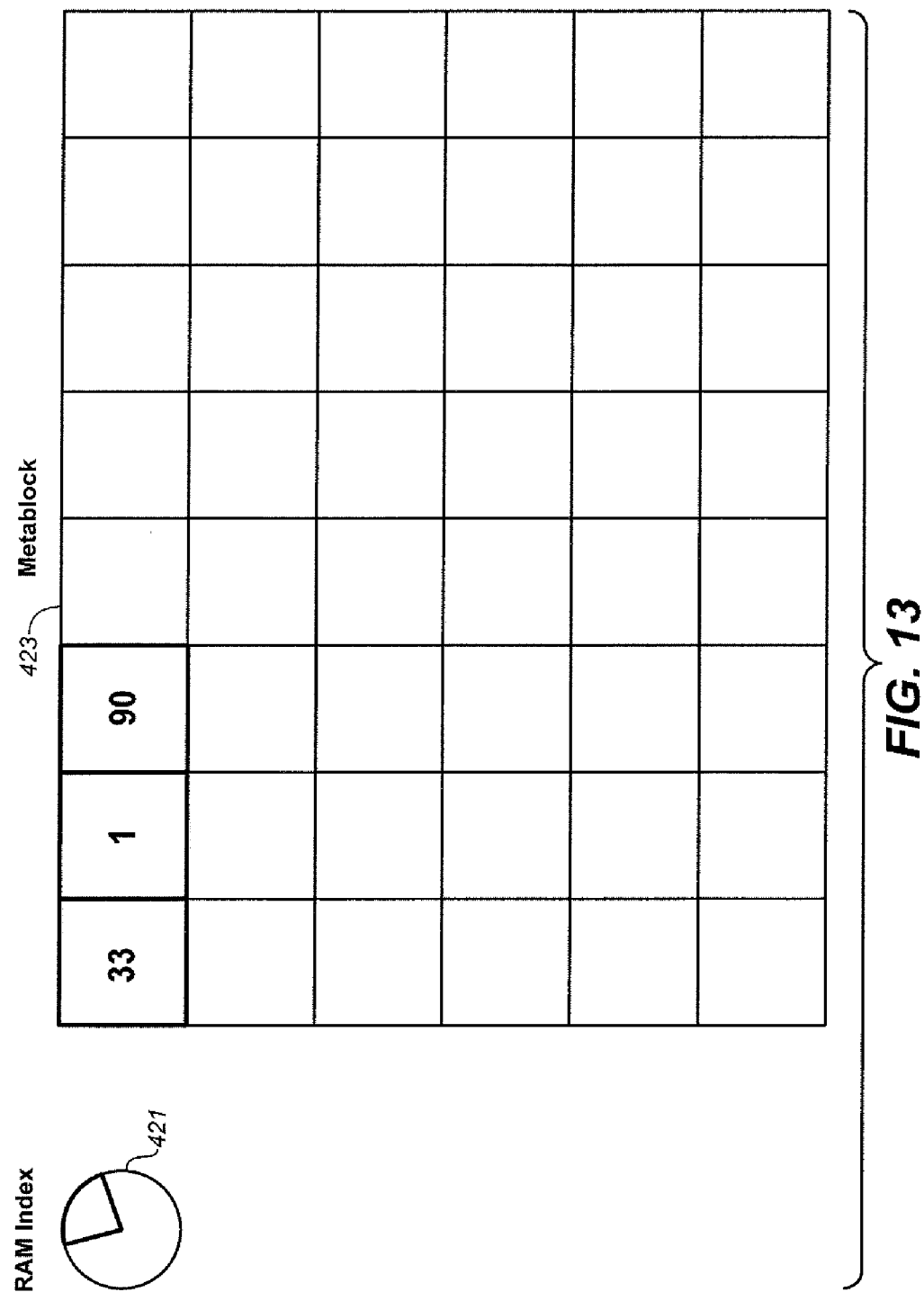
FIGS. 13-18 shows the writing a sequence of data fragments and mapping indices to a physical block of the memory.
Figure 14:
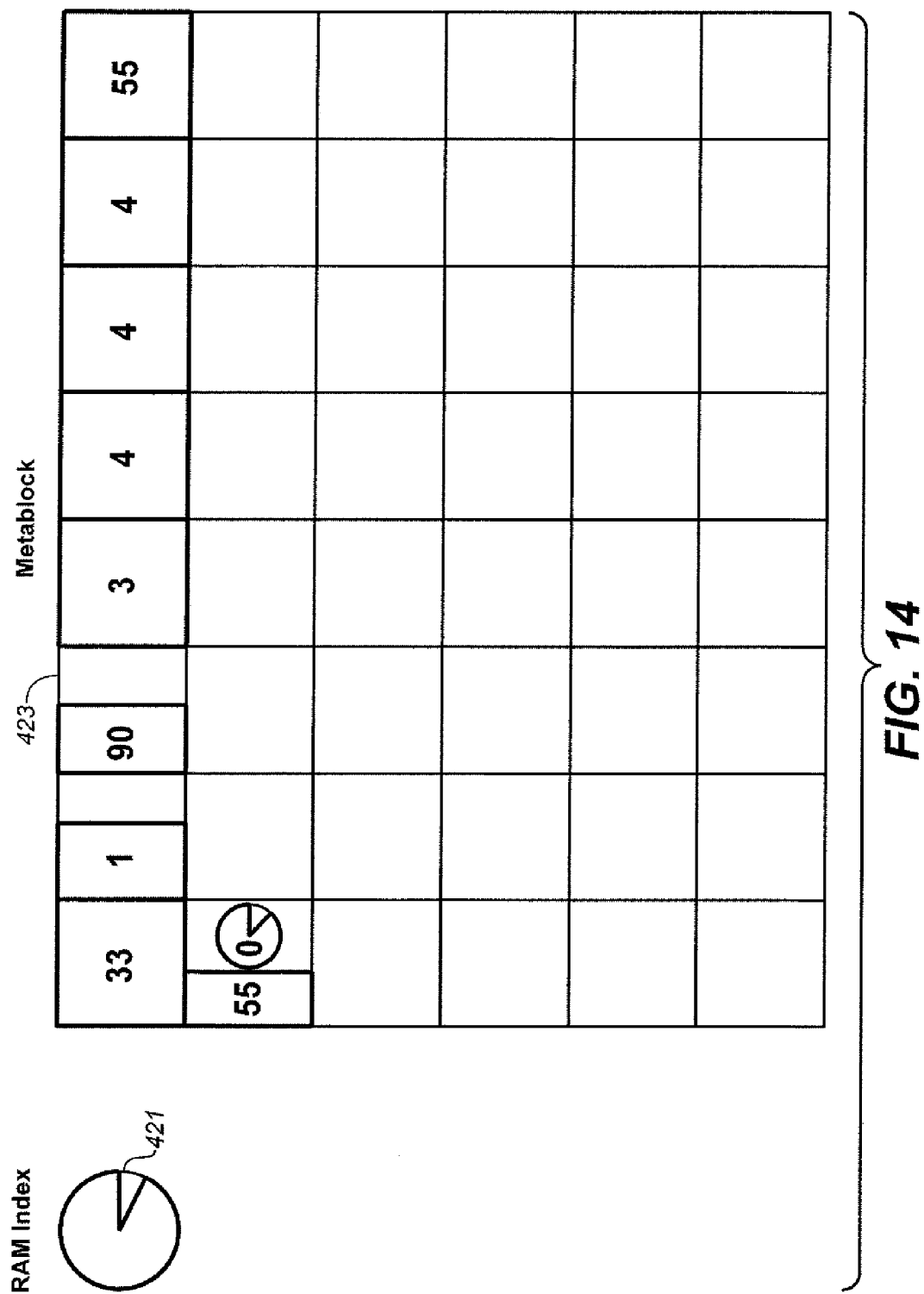
Figure 15:
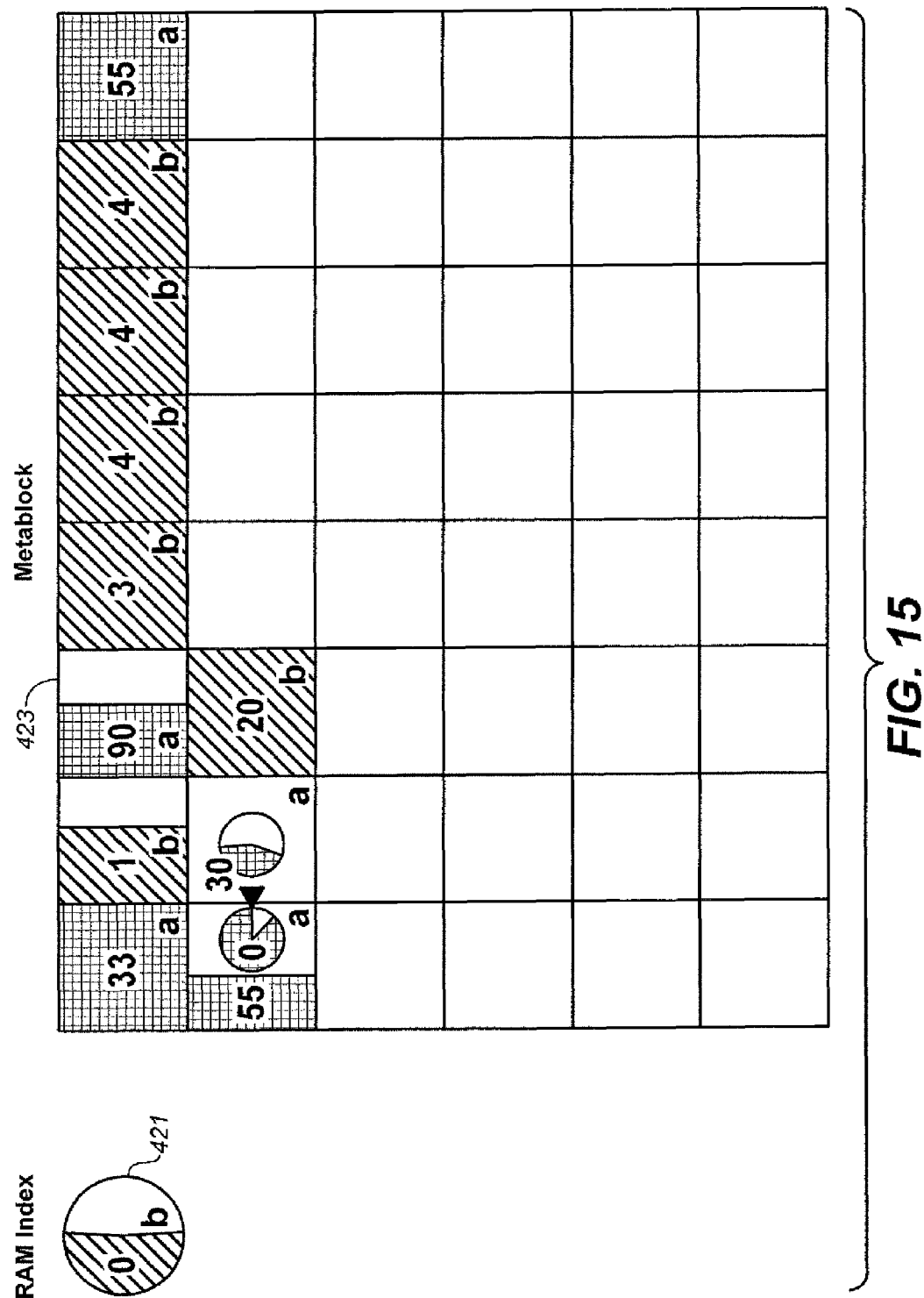

FIG. 13 shows the initial writes of data to the physical block 423 will use a single index 421 that exists in the system's RAM (130, FIG. 1). Fragments from any LG will be stored in this index. As more fragments are added to the system the index becomes full, as shown in FIG. 14. If there is space in a physical page after accounting for the host data segment, an index can also be written as part of the page, as shown for the last written page with a fragment of logical group 55. Eventually, host writes will fill the index, at which point it will need to be split, as shown in FIG. 15, here trigger by a write of logical group 20. The split will form two indices from the original, plus information from the fragment that caused the split. The indices are split so as to equally load the new indexes. In this example, fragments with logical address >30 (marked with an "a") are now referenced by different index, which has now been written in the block 423. The fragments themselves have not and cannot change as they are already written into non-volatile memory. The index 421 for logical groups 0-29 (whose fragments are marked with a "b") is maintained in RAM. As the last write in this example is to logical group 20, the system keeps the first BCI in RAM as "dirty" and programs the second to the empty half of the page after segment for LG 55. (An alternative to the sequence presented here is to always dump the BCI every time the system can, when there is a gap in the page which would otherwise be wasted.)

One of the main advantages of this design is a controlled number of address tables stored in flash that changes dynamically, on demand, never taking an unnecessarily high amount of space, so that the logical range of each index and its efficiency is maximized. Another is that as writes are to physical pages (typically 8 KB), there is often an empty unused space at the end of the page, as data fragments are often ~4 KB. In this case, the page is programmed with both data and index together. (In the figures this is shown by placing an index and data in the same physical block.)

Figure 16:
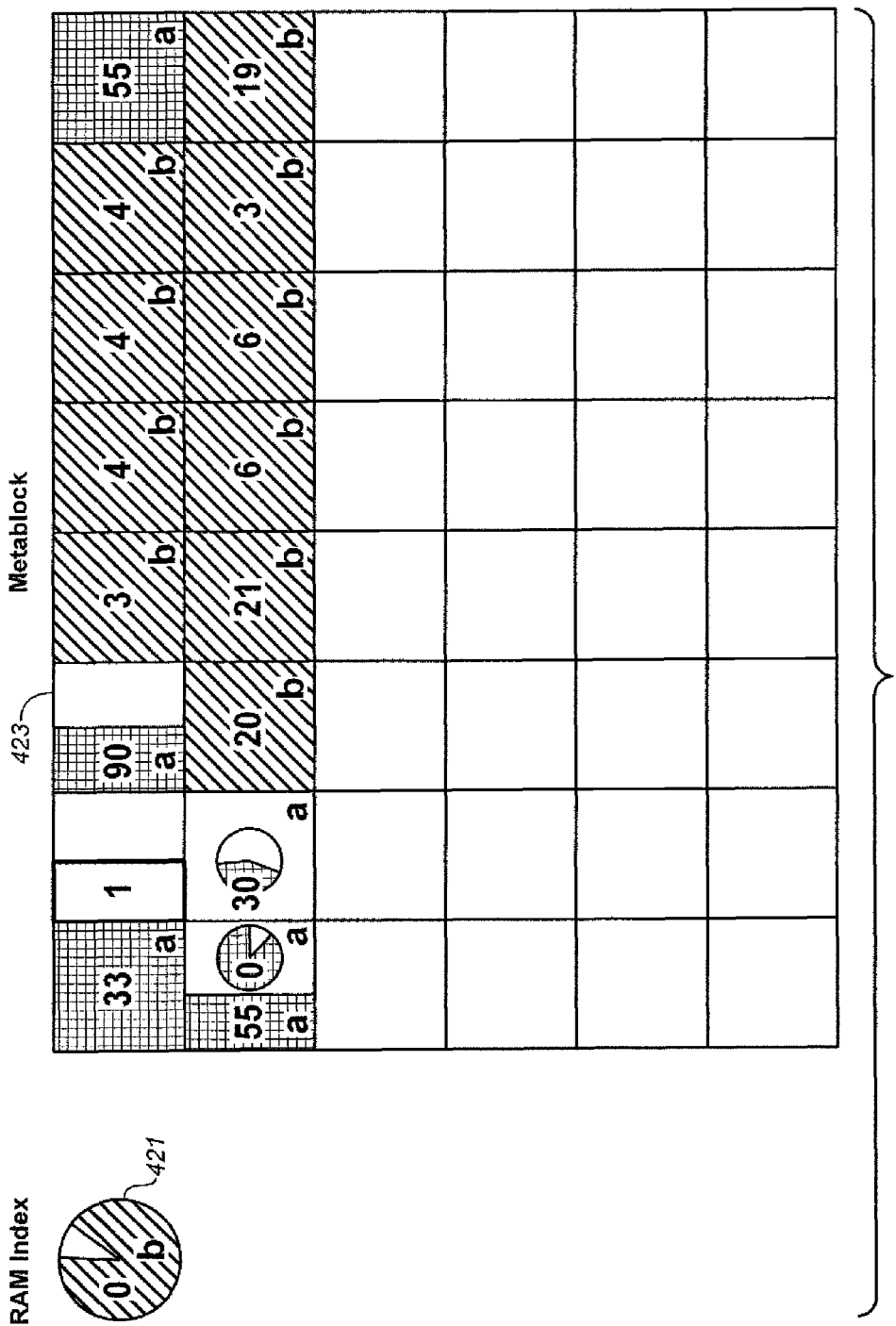
Figure 17:
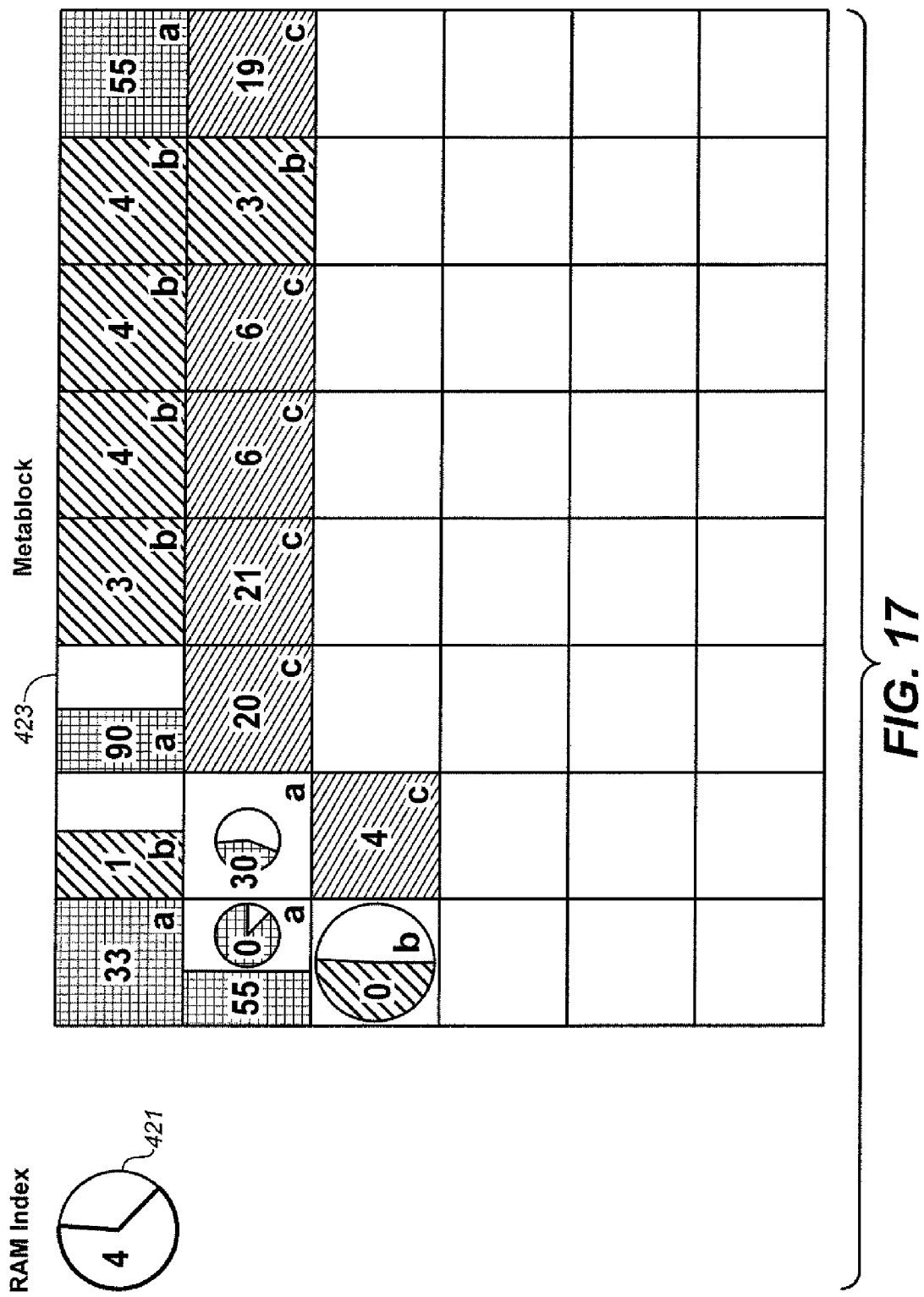
Figure 18A:
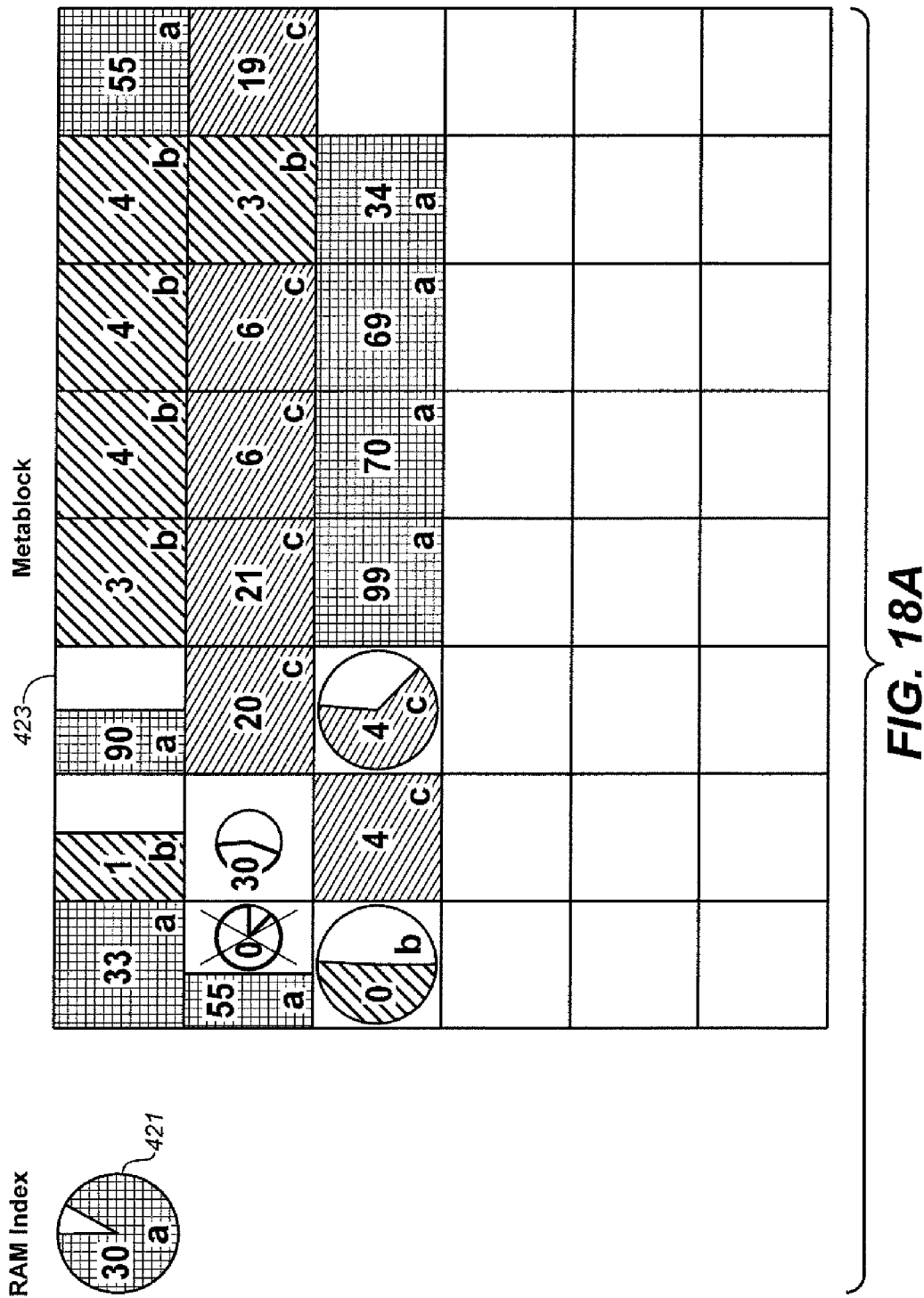
Figure 18B:
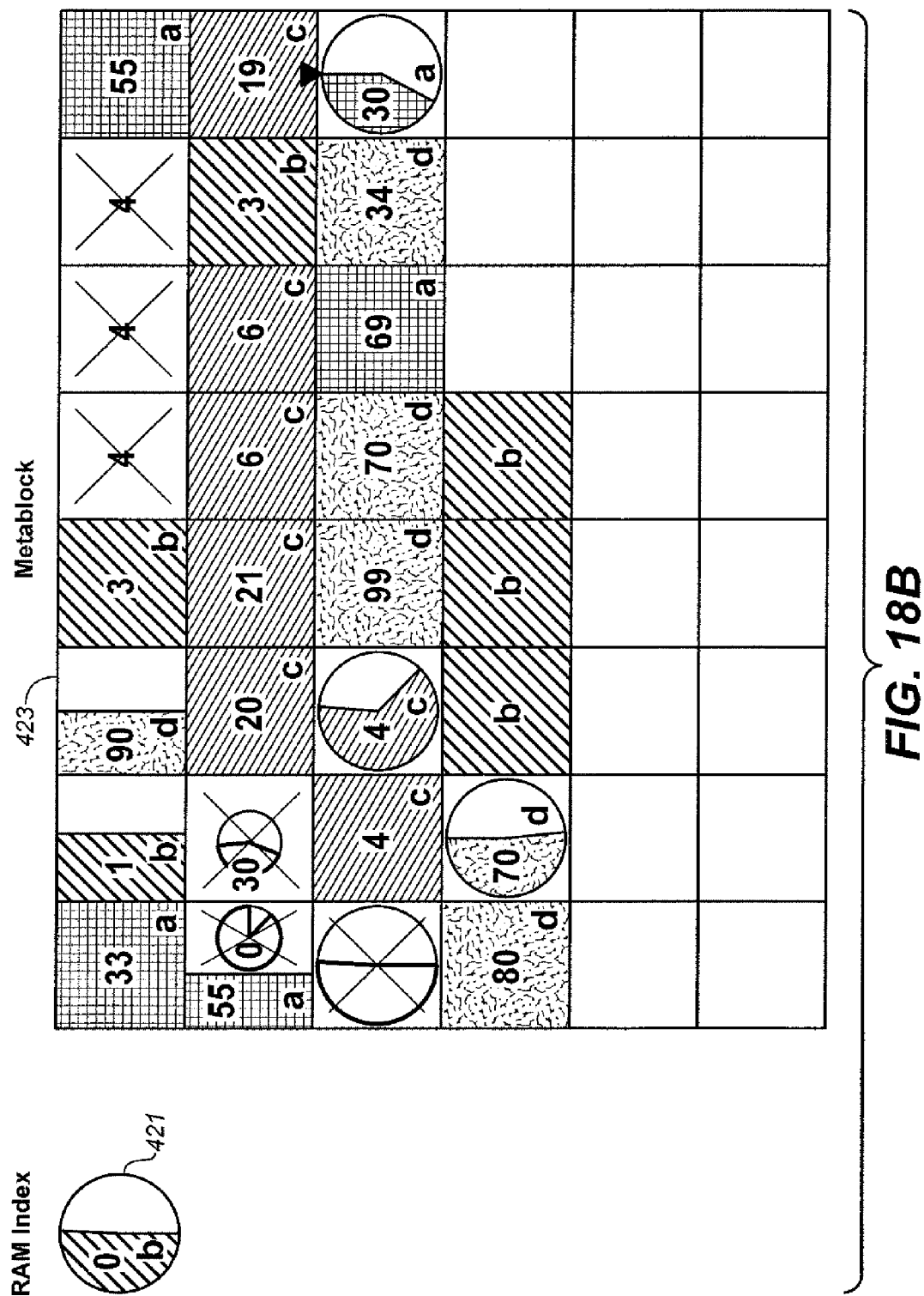

Further writes will lead to the new index filling up, as shown in the example of FIG. 16. When this index has filled a further split occurs, as in FIG. 17. Further writes to LGs>30 result in the RAM index being written to flash and updates to "a" range index, as shown in FIG. 18A. Note that the original "a" range index has been orphaned. It now obsolete and will not be used again. Further writes to the memory result in more splits. As shown in FIG. 18B, another index has become obsolete, and several fragments within LG4 have become obsolete. Host writes to the "b" index range then makes obsolete previously written fragments within LG 4. Another index has become obsolete. As more host writes occur, more indexes and fragments will become obsolete. These obsolete indices and fragments can become a significant portion of the physical space of the system. Block compaction is used to remove obsolete fragments and indices from the system.

Figure 19:
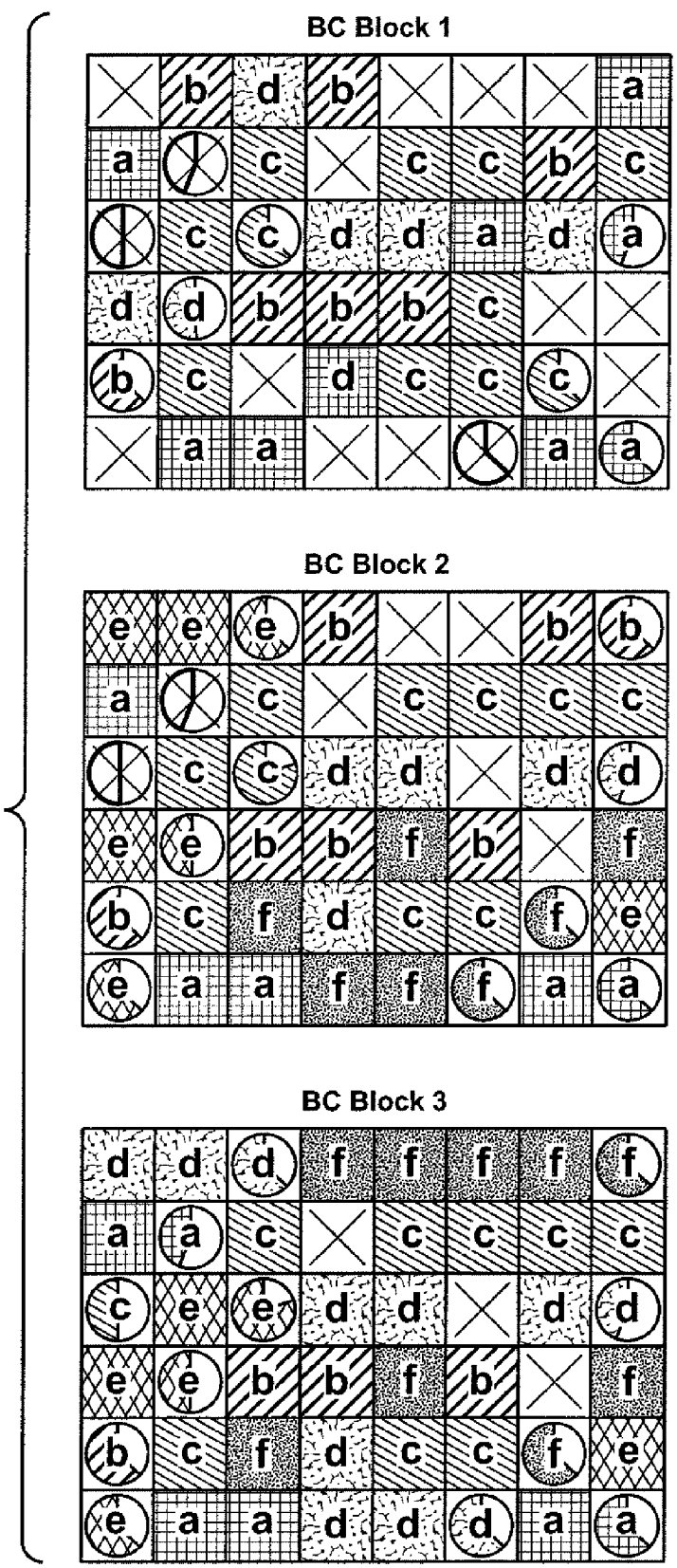
FIG. 19 illustrates an example of three filled blocks prior to compaction.

To look at block compaction, consider a system with three binary cache blocks, such as is shown in FIG. 19. All of the blocks are full. The block with the least amount of valid data is chosen to be compacted as this will free up the most space in the system for additional host data. Of the three blocks in FIG. 19, Block 1 contains the most obsolete data and is therefore chosen as the compaction source. The valid data from this block is copied into a new block. The original block is returned to the system for future use.

Figure 20:
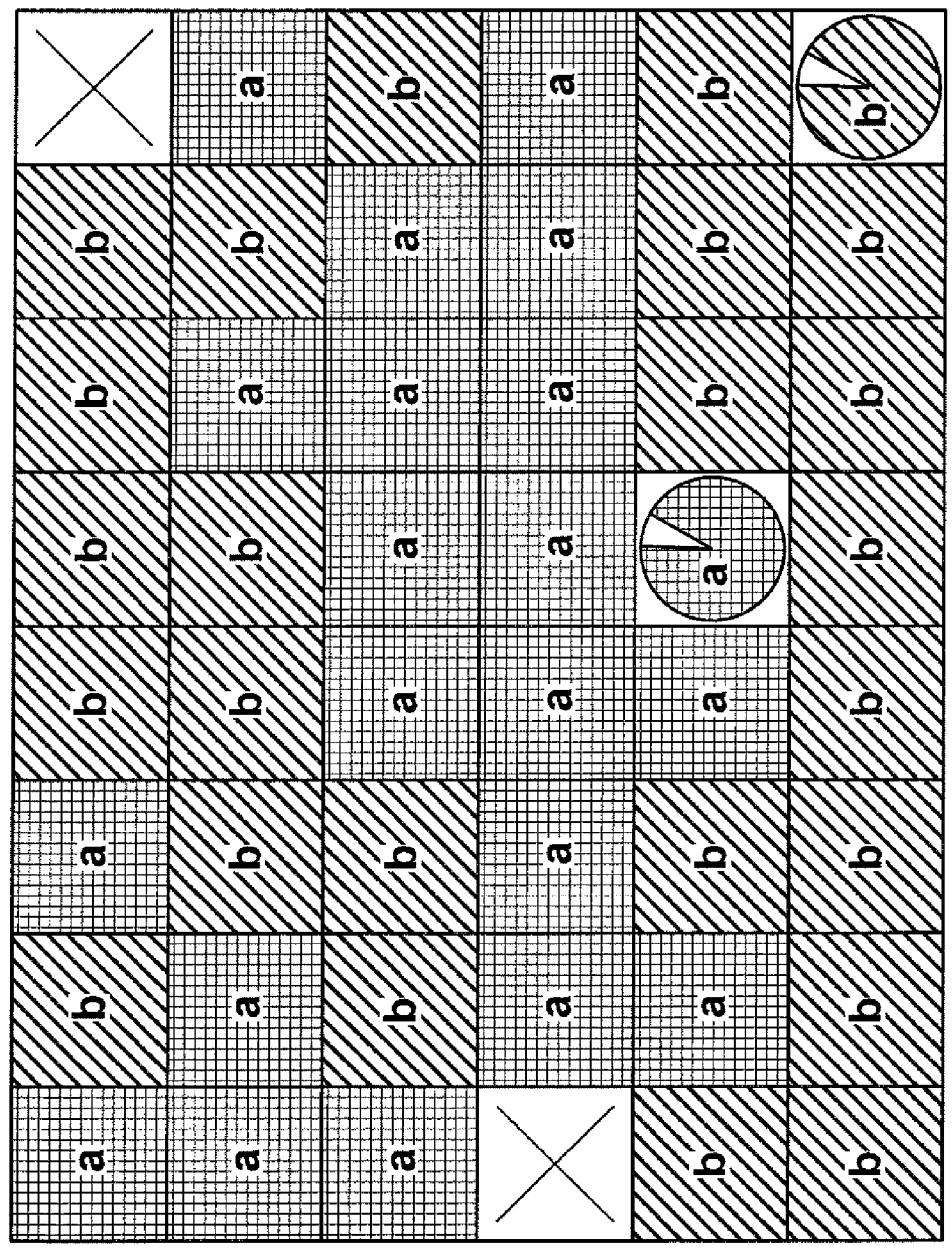
FIG. 20 is an example of a block just after it has become full.

FIG. 20 shows an example of a block just after it has become full. Note the lack of indices required to reference the data fragments. Also most data is valid. In this instance fragments will exist over the full logical range of the device. Few indices are required because data fragments are large. This is most likely to occur early in the life of the device.

Figure 21:
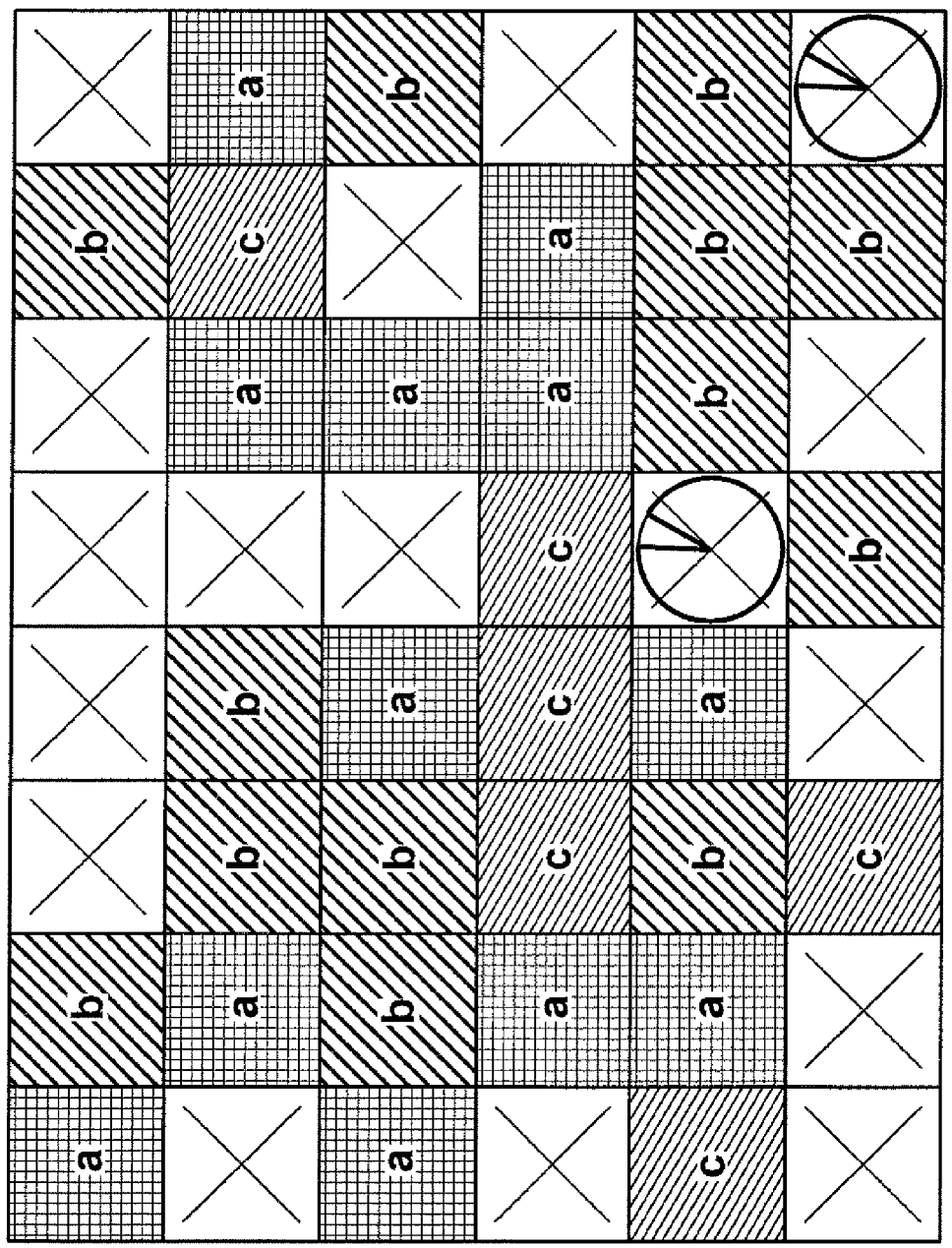
FIG. 21 shows the "normal" state of a block before it is compacted.

FIG. 21 shows an example of a more typical or "normal" state of a block before it is compacted. As shown, multiple fragments have been made obsolete by host writes to other blocks.

Figure 22:
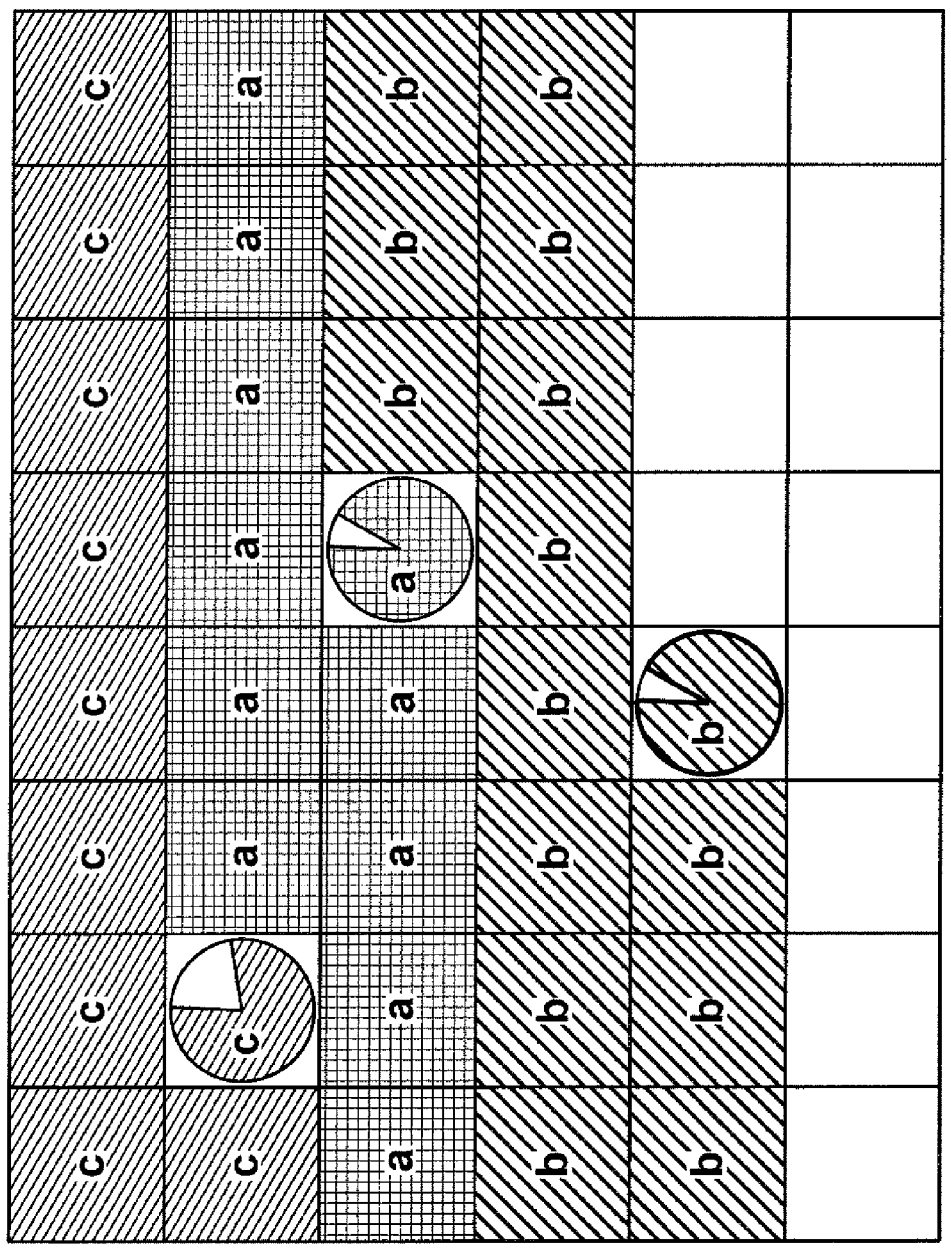
FIG. 22 shows an example of a successful compaction.

FIG. 22 shows an example of successful compaction. Obsolete data and indices have been removed and space regained in the compacted block.

Figure 23:
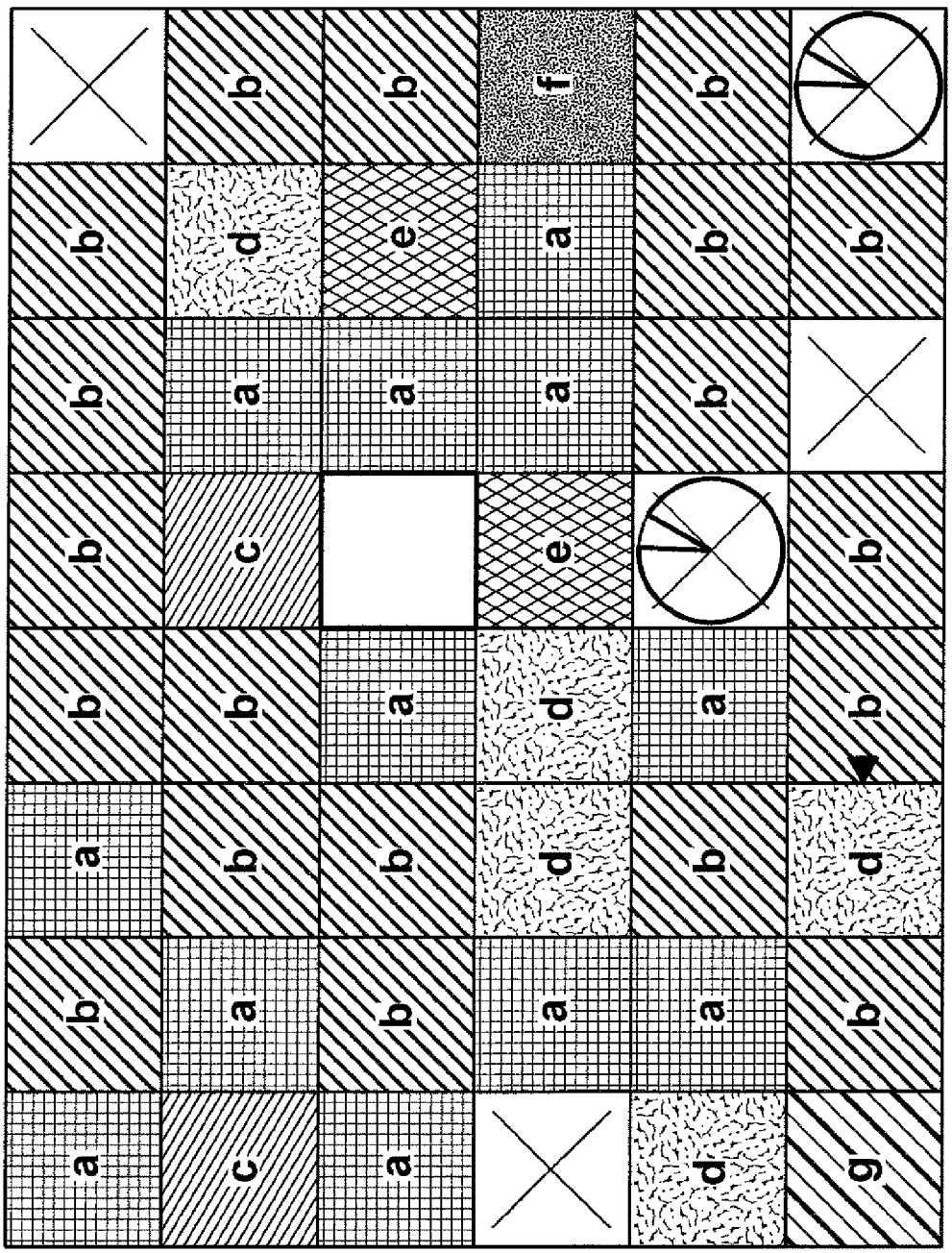
FIG. 23 illustrates a block in danger of "failing" compaction.

There are instances when a block can be in danger of "failing" compaction. As additional host writes occur, the indices will split and split again as the number of fragments to be indexed increases. This can lead to a situation where the compacted block contains more indexes than the original. It can even result in the amount of data that must be stored in the block increasing. This will lead to the compacted block overflowing. FIG. 23 shows such a block in danger of failing compaction. Multiple indices, based in other blocks, refer to data in this block, most of whose data is valid.

Figure 24:
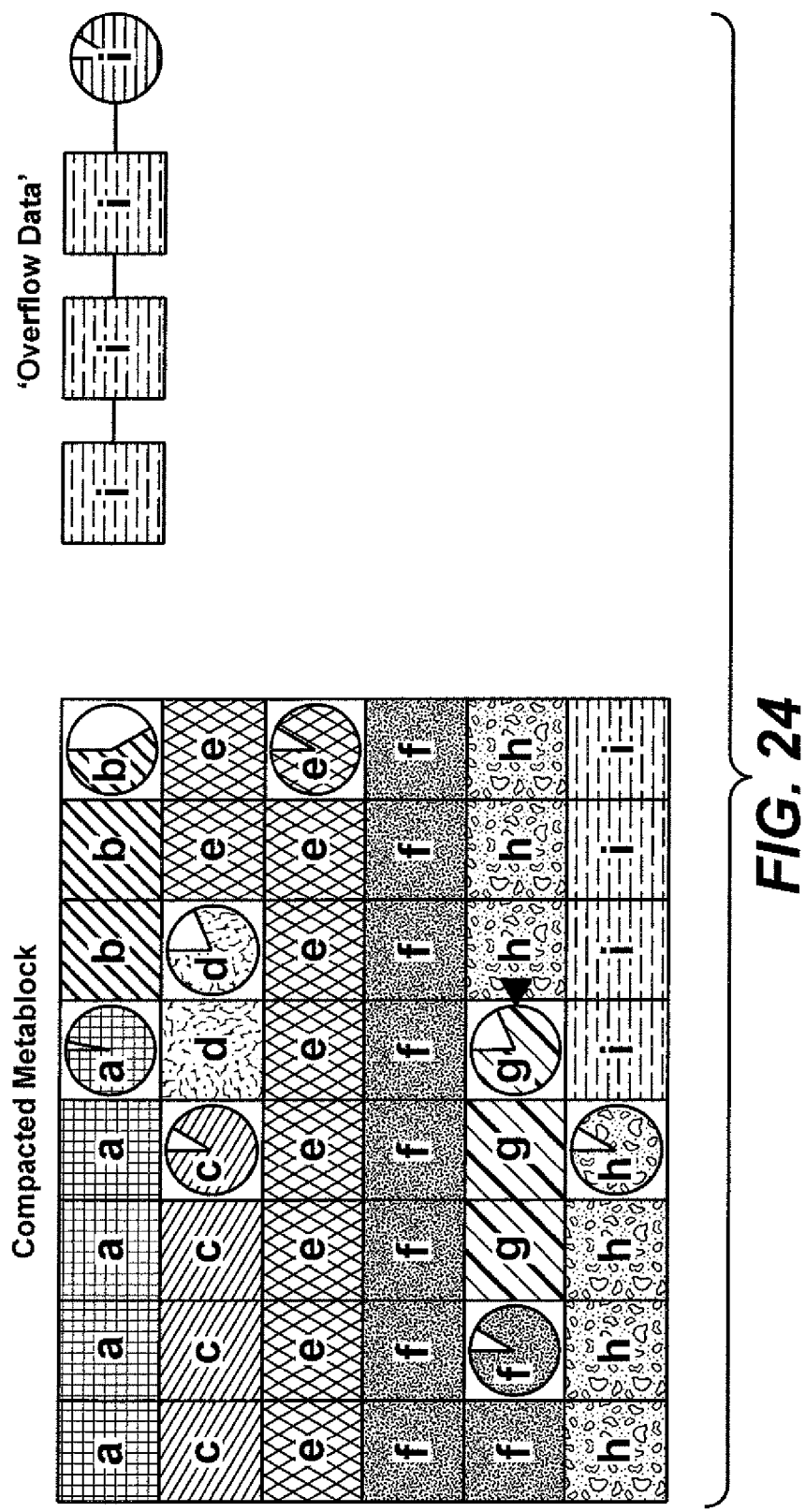
FIG. 24 illustrates a "failed" compaction.

An example of such a failed compaction is shown in FIG. 24. As shown there, a compaction results in the block being filled, but with 3 pages of data and an index left over that would not fit. The techniques presented in the next section can avoid this failure.

Exemplary Implementation

To overcome this sort of difficulty, this section describes methods of maintaining data and address tables written together to a shared blocks with the purpose of maximising write performance. The discussion is again presented in the context of a binary cache index (BCI) implementation, with the more general situation discussed in the next section.

In a principle aspect presented here, during compaction, the system will write data fragments (or, more generally, data segments) to the active physical block of the binary cache, while the indices are written to a separate BCI block. By writing the BCIs to a separate BCI block, the system only needs to write the indices that require an extra page. This also allows the indices to be written for "free" as they can be combined with a write of data to the currently active block. Further, this arrangement will result in a compaction always gaining space. Thus, although it requires a block being set aside for use of the indices, it will directly eliminate the "failed" compaction problem discussed in the latter part of the last section.

When the system writes new fragments, these will be written together along with any indices to the active block. That is, this will be done as described in the earlier part of the preceding section, with the data and indices being able to be programmed in parallel as part of a single write, so that write performance is not negatively affected. During compaction, however, the indices are then compacted separately from the data block, so this will save on any needed extra blocks at the time compaction. (Each "failed" compaction, such as illustrated with respect to FIG. 24, would require such an additional block.)

This technique does need an extra block to be used for the compaction of indices. However, as it will avoid the "failed", it will likely save on the needed number of data blocks in the binary cache section of the memory. Because of this, it can also reduce the need for introduction of a guard band to protect again the worst case situation due to this particular mechanism. (More detail on the use of guard bands is presented in a US patent application entitled "Use of Guard Bands and Phased Maintenance Operations to Avoid Exceeding Maximum Latency Requirements in Non-Volatile Memory Systems", of Sergey Anatolievich Gorobets, Robert George Young, and Alan David Bennett, filed concurrently with the present application, which is described in the same context as the description presented here.) In some applications, such as where the memory involved (here the binary cache section) is particularly small, such as only a few blocks, or where the memory only deals with data having have certain characteristics, the setting aside of a block just for the compaction of indices may not be preferred; but for the typical memory system operating with the sort of large data structures described in the Background, this setting aside a single block is typically a more than acceptable price for the improvements in can provide.

Figure 25:
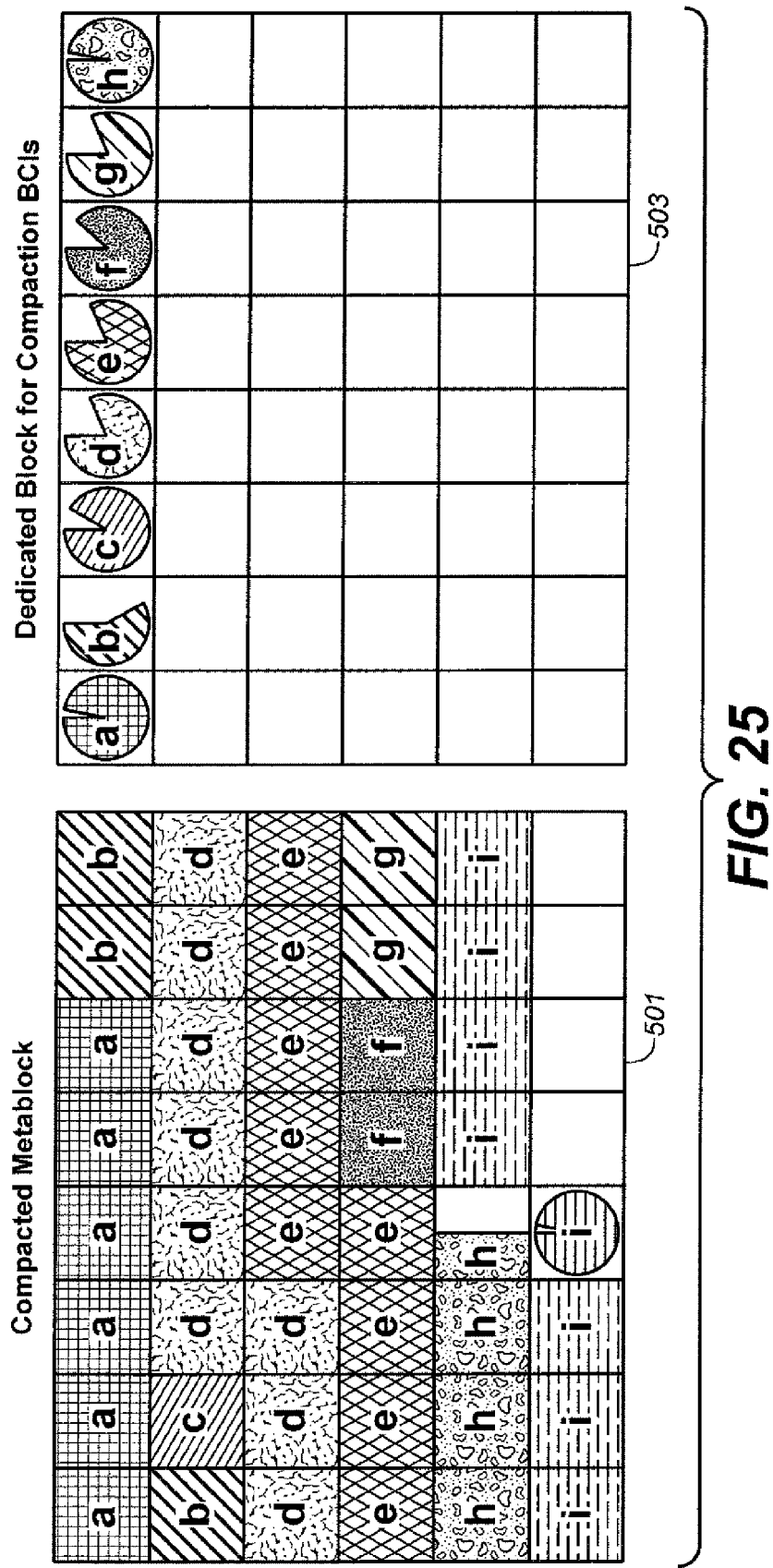
FIGS. 25 and 26 show a first exemplary embodiment and an alternate embodiment for using a dedicated block for indices created as a result of compaction.

The diagram of FIG. 25 illustrates the workings of the method just described. In FIG. 25, the same block has been compacted as in FIG. 24. In this case, however, all of the data has been written in the block 501. The indices have now instead been written into the block 503 that has been set aside for just indices. Only for the last set of fragments (the darkest pages of the "i" range) is the index written into the compacted metablock 501 holding the data.

Figure 26:
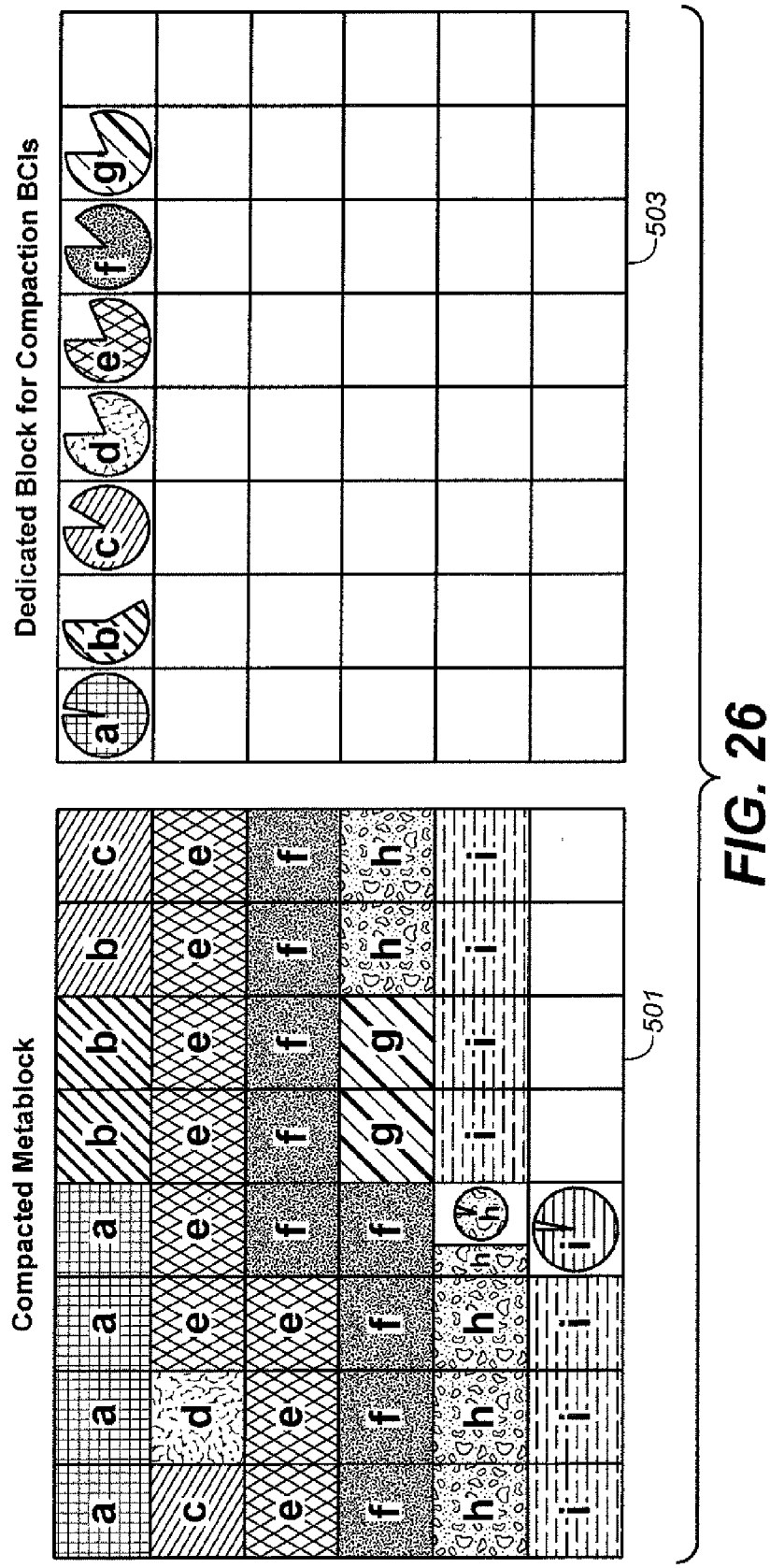

FIG. 26 illustrates an alternate embodiment that can further optimize the dedicated block approach. If a fragment in the compacted block does not end on physical page boundary, it may be possible to place an index into the otherwise unused space. This is shown in FIG. 26 for the last block of the "h" range, whose index is now stored in what would otherwise be an unused portion a page of block 501, rather than being stored in the dedicated index block 503. This will reduce the load on the dedicated block.

Generalized Implementation

The description above has been in the context of a memory that includes both binary and multi-level sections, where the binary section serves a cache function, as shown in FIG. 11. Under this arrangement, the data written into the binary portion are usually fragments of a logical group. Although this is the exemplary embodiment, the techniques are more generally applicable.

More generally, in a memory system where data segments (whether fragments, whole data sets, or both) are first written to blocks which are then later consolidated, the presented techniques can be used. In addition to the blocks used for data, there will need to be at least one block set aside for holding indices, corresponding block 503 of FIGS. 24 and 25, upon compaction. When an index is first written in the non-volatile memory, the logical to physical mapping is written in an active block, as is any data. During consolidation, one or more of the indices in the block being compacted will then be written into the dedicated block for such indices.

In most application the RAM indices 421 of FIGS. 13-18 will be maintained in the RAM memory 130 (FIG. 1) of controller 100. More generally, however, it can be held in other RAM memory on the system. It will be understood that the processes described with respect to FIGS. 13-26 can implemented on the system in various combinations of hardware, software, and firmware. Most typically, it would be implemented as module or logic module as software/firmware running on the controller as part of the back-end system 320 (FIG. 8) involved in the logical to physical conversion process described with respect to FIG. 10B. For any of the embodiments, the techniques presented here can improve performance by increasing the amount of useful physical capacity by removing old, stale copies of logical-to-physical mapping indices written during compaction. Even though logical-to-physical mapping data is eventually written to a dedicated block (or one of several such blocks) during compaction, when the data is initially written in, the full advantages of the parallel programming of data and indices to the same page is maintained. This helps to eliminate the risk of long delays and performance drops associated with increased table size due to the host's increased randomness of writes.

Conclusion

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A method of operating a memory system that includes a memory circuit having an array of non-volatile memory cells and a controller circuit, the controller overseeing the transfer of user data between a host and the memory array and managing the storage of user data on the memory array, the method comprising:

receiving from the host at the controller one or more segments of user data identified by a respective logical address;

assigning by the controller of a respective physical address in a first block of the memory array to each of the segments of user data;

maintaining by the controller of a mapping of the correspondence between the respective logical and physical addresses for each of the segments of user data;

writing a first set of one or more of the segments of user data as a plurality of write pages to the corresponding assigned physical addresses in the first block of the memory array;

writing the logical to physical mapping for the first set of segments of user data to a write page of the first block, wherein the logical to physical mapping includes the logical to physical mapping of one or more of the segments of user data written to the first block prior to writing the logical to physical mapping thereto; and subsequently performing a data consolidation operation including:

consolidating segments of the first set of segments of user data from the first block into a second block; and writing the logical to physical mapping for the consolidated segments of the first set of segments to a third block dedicated to storing logical to physical mappings.

2. The method of claim 1, further comprising:

maintaining the logical to physical mapping for the first set of segments of user data in RAM memory on the controller prior to writing the logical to physical mapping for the first set of segments of user data to the first block.

3. The method of claim 1, wherein the logical to physical mapping for the first set of segments of user data to the first block is written to the first block as part of the same write page as a segment of user data.

4. The method of claim 1, wherein the consolidated segments include fragments of data from a logical group of data.

5. The method of claim 1, wherein the memory circuit includes a plurality of erase blocks operated by the controller in a binary mode and a plurality of erase blocks operated by the controller in a multi-state mode, where the first, second and third blocks are binary blocks.

6. The method of claim 1, wherein consolidating segments of the first set of segments of user data includes removing obsolete segments and the logical to physical mapping corresponding to the obsolete segments.

7. The method of claim 1, further comprising, prior to performing the data consolidation operation:

writing a second set of one or more of the segments of user data to the corresponding assigned physical addresses of the memory array; and writing the logical to physical mapping for the second set of segments of user data to the first block, and wherein the data consolidation operation further includes:

consolidating segments of the second set of segments of user data from the first block into the second block; and writing the logical to physical mapping for the consolidated segments of the second set of segments into the second block as part of the same page as user data of the consolidated segments of the second set of segments.

8. The method of claim 1, wherein the segments of data correspond to a portion of a logical group of data spanning multiple pages.

* * * * *